United States Patent
Kumar et al.

(10) Patent No.: US 9,495,076 B2
(45) Date of Patent: *Nov. 15, 2016

(54) PLAYLIST MODIFICATION

(71) Applicant: Sonos, Inc., Santa Barbara, CA (US)

(72) Inventors: Abhishek Kumar, Santa Barbara, CA (US); Andrew Schulert, Cambridge, MA (US); Robert Andrew Lambourne, Santa Barbara, CA (US); Arther L. Coburn, IV, Santa Barbara, CA (US)

(73) Assignee: SONOS, INC., Santa Barbara, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/904,944

(22) Filed: May 29, 2013

(65) Prior Publication Data

US 2014/0181656 A1     Jun. 26, 2014

(51) Int. Cl.
*G06F 3/00* (2006.01)
*G06F 3/0482* (2013.01)
*H04L 12/64* (2006.01)

(52) U.S. Cl.
CPC ......... *G06F 3/0482* (2013.01); *H04L 12/6418* (2013.01)

(58) Field of Classification Search
CPC ............. G06F 17/30749; G06F 11/1464; G06F 3/04817; G06F 3/0486; G06F 3/165; G06F 17/30017; G06F 21/6218; G06F 3/0482; G06F 3/0488; G06F 17/30581
See application file for complete search history.

(56) References Cited

U.S. PATENT DOCUMENTS

| | | | |
|---|---|---|---|
| 5,406,634 A | 4/1995 | Anderson et al. | |
| 5,856,827 A | 1/1999 | Sudo | |
| 5,923,902 A | 7/1999 | Inagaki | |
| 6,002,862 A | 12/1999 | Takaike | |

(Continued)

FOREIGN PATENT DOCUMENTS

| | | |
|---|---|---|
| JP | 2007060123 A | 3/2007 |
| KR | 20090017795 | 2/2009 |

(Continued)

OTHER PUBLICATIONS

Bluetooth. "Specification of the Bluetooth System: The ad hoc Scatternet for affordable and highly functional wireless connectivity" Core, Version 1.0 A, Jul. 26, 1999, 1068 pages.

(Continued)

*Primary Examiner* — William Bashore
*Assistant Examiner* — Rayeez Chowdhury

(57) ABSTRACT

Embodiments provided herein involve connected states between a mobile device and one or more zones in a network media system and different interactions between the mobile device and the network media system involving the connected states. The connected states may be established between the mobile device and the one or more zones such that further actions taken on media items identified in the playlist on the mobile device may also be taken on corresponding media items in a playback queue associated with the one or more zones. The interface on the mobile device may display various graphical representations to indicate the different interactions involving the connected states, including when a connected state is established, when a connected state is lost, and when a reconnected state is reestablished. The interface may further provide selectable icons to allow a user to navigate among the different media playback options involving the connected states.

23 Claims, 25 Drawing Sheets

(56) References Cited

U.S. PATENT DOCUMENTS

| | | |
|---|---|---|
| 6,181,316 B1 | 1/2001 | Little et al. |
| 6,255,961 B1 | 7/2001 | Van Ryzin et al. |
| 6,256,554 B1 | 7/2001 | DiLorenzo |
| 6,404,811 B1 | 6/2002 | Cvetko et al. |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 * | 11/2004 | Wheeler ............... H04H 20/63 379/101.01 |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,178,106 B2 | 2/2007 | Lamkin et al. |
| 7,187,947 B1 | 3/2007 | White et al. |
| 7,236,773 B2 | 6/2007 | Thomas |
| 7,312,785 B2 | 12/2007 | Tsuk et al. |
| 7,358,960 B2 | 4/2008 | Mak |
| 7,483,538 B2 | 1/2009 | McCarty et al. |
| 7,509,181 B2 | 3/2009 | Champion |
| 7,571,014 B1 * | 8/2009 | Lambourne ............ H04R 27/00 700/94 |
| 7,643,894 B2 | 1/2010 | Braithwaite et al. |
| 7,657,910 B1 | 2/2010 | McAulay et al. |
| 7,689,304 B2 | 3/2010 | Sasaki |
| 7,725,533 B2 | 5/2010 | Szeto et al. |
| 7,725,551 B2 | 5/2010 | Szeto et al. |
| 7,742,740 B2 | 6/2010 | Goldberg et al. |
| 7,805,682 B1 * | 9/2010 | Lambourne ........... G06F 3/0482 715/764 |
| 7,827,259 B2 | 11/2010 | Heller et al. |
| 7,853,341 B2 | 12/2010 | McCarty et al. |
| 7,958,441 B2 | 6/2011 | Heller et al. |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,055,364 B2 | 11/2011 | Champion |
| 8,060,407 B1 | 11/2011 | Delker et al. |
| 8,072,905 B2 | 12/2011 | Haff et al. |
| 8,074,253 B1 | 12/2011 | Nathan |
| 8,099,313 B2 | 1/2012 | Messer et al. |
| 8,103,009 B2 | 1/2012 | McCarty et al. |
| 8,111,132 B2 | 2/2012 | Allen et al. |
| 8,131,390 B2 | 3/2012 | Braithwaite et al. |
| 8,140,974 B2 | 3/2012 | Hayter et al. |
| 8,148,622 B2 | 4/2012 | Rothkopf et al. |
| 8,156,435 B2 | 4/2012 | Wohlert |
| 8,204,890 B1 | 6/2012 | Gogan |
| 8,214,740 B2 | 7/2012 | Johnson |
| 8,234,395 B2 | 7/2012 | Millington |
| 8,290,603 B1 | 10/2012 | Lambourne |
| 8,316,154 B2 | 11/2012 | Yoneda |
| 8,364,296 B2 | 1/2013 | Wilhelm |
| 8,407,623 B2 | 3/2013 | Kerr et al. |
| 8,483,853 B1 | 7/2013 | Lambourne |
| 8,544,046 B2 | 9/2013 | Gran et al. |
| 8,799,395 B2 | 8/2014 | Seidel et al. |
| 8,818,538 B2 | 8/2014 | Sakata |
| 8,843,586 B2 | 9/2014 | Pantos et al. |
| 8,880,648 B1 | 11/2014 | Arora et al. |
| 8,954,177 B2 | 2/2015 | Sanders |
| 8,966,394 B2 | 2/2015 | Gates et al. |
| 9,137,602 B2 | 9/2015 | Mayman et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0079038 A1 * | 4/2003 | Robbin ................ G06F 1/1613 709/232 |
| 2003/0157951 A1 | 8/2003 | Hasty |
| 2003/0198257 A1 | 10/2003 | Sullivan et al. |
| 2003/0210796 A1 | 11/2003 | McCarty et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0215611 A1 | 10/2004 | Jawa et al. |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0155072 A1 | 7/2005 | Kaczowka et al. |
| 2005/0166157 A1 | 7/2005 | Ollis et al. |
| 2005/0240494 A1 | 10/2005 | Cue et al. |
| 2005/0262253 A1 | 11/2005 | Li et al. |
| 2006/0002681 A1 | 1/2006 | Spilo et al. |
| 2006/0041639 A1 | 2/2006 | Lamkin et al. |
| 2006/0062094 A1 | 3/2006 | Nathan et al. |
| 2006/0107237 A1 | 5/2006 | Kim |
| 2006/0156236 A1 * | 7/2006 | Heller ................ G11B 27/105 715/716 |
| 2006/0168340 A1 * | 7/2006 | Heller et al. .................. 709/242 |
| 2006/0195480 A1 | 8/2006 | Spiegelman et al. |
| 2006/0195864 A1 | 8/2006 | New et al. |
| 2006/0218294 A1 | 9/2006 | Rosenberg |
| 2006/0253782 A1 | 11/2006 | Stark et al. |
| 2006/0258289 A1 | 11/2006 | Dua |
| 2006/0263048 A1 | 11/2006 | Sato et al. |
| 2007/0038999 A1 | 2/2007 | Millington |
| 2007/0061725 A1 | 3/2007 | Isaac et al. |
| 2007/0067808 A1 | 3/2007 | DaCosta |
| 2007/0083897 A1 | 4/2007 | Brownell |
| 2007/0142944 A1 | 6/2007 | Goldberg et al. |
| 2007/0169087 A1 * | 7/2007 | Fadell ............... H04L 29/06027 717/168 |
| 2007/0266065 A1 | 11/2007 | Rosenberg |
| 2007/0288470 A1 | 12/2007 | Kauniskangas et al. |
| 2008/0005690 A1 | 1/2008 | Van Vugt |
| 2008/0016465 A1 | 1/2008 | Foxenland |
| 2008/0025535 A1 | 1/2008 | Rajapakse |
| 2008/0059567 A1 | 3/2008 | Williams et al. |
| 2008/0086379 A1 | 4/2008 | Dion et al. |
| 2008/0133715 A1 * | 6/2008 | Yoneda ............... H04L 12/2821 709/219 |
| 2008/0134256 A1 | 6/2008 | DaCosta |
| 2008/0177822 A1 | 7/2008 | Yoneda |
| 2008/0209487 A1 | 8/2008 | Osann et al. |
| 2008/0242222 A1 | 10/2008 | Bryce et al. |
| 2008/0292120 A1 | 11/2008 | Wilson |
| 2009/0006542 A1 | 1/2009 | Feldman et al. |
| 2009/0059512 A1 | 3/2009 | Lydon et al. |
| 2009/0097818 A1 | 4/2009 | Hirata |
| 2009/0132712 A1 | 5/2009 | P et al. |
| 2009/0171487 A1 | 7/2009 | Wilhelm |
| 2009/0172542 A1 | 7/2009 | Girish et al. |
| 2009/0197524 A1 | 8/2009 | Haff et al. |
| 2009/0222392 A1 | 9/2009 | Martin et al. |
| 2009/0228919 A1 * | 9/2009 | Zott ................... H04N 7/17318 725/34 |
| 2009/0248702 A1 | 10/2009 | Schwartz et al. |
| 2009/0249222 A1 | 10/2009 | Schmidt et al. |
| 2009/0259765 A1 | 10/2009 | Karlsson et al. |
| 2009/0275285 A1 | 11/2009 | Maricevic et al. |
| 2010/0005496 A1 | 1/2010 | Ellis et al. |
| 2010/0009674 A1 | 1/2010 | Sapkota et al. |
| 2010/0031366 A1 | 2/2010 | Knight et al. |
| 2010/0042235 A1 | 2/2010 | Basso et al. |
| 2010/0082725 A1 | 4/2010 | Onishi |
| 2010/0082731 A1 | 4/2010 | Haughay et al. |
| 2010/0087214 A1 | 4/2010 | Bournel et al. |
| 2010/0095332 A1 * | 4/2010 | Gran ................ G06F 17/30038 725/93 |

(56) References Cited

U.S. PATENT DOCUMENTS

| | | |
|---|---|---|
| 2010/0206815 A1 | 8/2010 | Garusi et al. |
| 2010/0211438 A1 | 8/2010 | Lutnick et al. |
| 2010/0250669 A1 | 9/2010 | Pan |
| 2010/0299402 A1 | 11/2010 | Korman et al. |
| 2010/0299639 A1 | 11/2010 | Ramsay et al. |
| 2010/0303244 A1 | 12/2010 | Kim et al. |
| 2010/0306815 A1 | 12/2010 | Emerson et al. |
| 2011/0004330 A1 | 1/2011 | Rothkopf et al. |
| 2011/0054641 A1 | 3/2011 | Hur |
| 2011/0055901 A1 | 3/2011 | Karaoguz et al. |
| 2011/0060998 A1 | 3/2011 | Schwartz et al. |
| 2011/0066943 A1 | 3/2011 | Brillon et al. |
| 2011/0131272 A1 | 6/2011 | Littlejohn et al. |
| 2011/0131518 A1 | 6/2011 | Ohashi |
| 2011/0131520 A1 | 6/2011 | Al-Shaykh et al. |
| 2011/0179455 A1 | 7/2011 | Thompson |
| 2011/0218656 A1* | 9/2011 | Bishop ............ G06F 17/30017 700/94 |
| 2011/0225496 A1 | 9/2011 | Jeffe et al. |
| 2011/0252118 A1 | 10/2011 | Pantos et al. |
| 2011/0265003 A1 | 10/2011 | Schubert et al. |
| 2011/0295974 A1 | 12/2011 | Kashef et al. |
| 2012/0029672 A1 | 2/2012 | Hamilton et al. |
| 2012/0038541 A1 | 2/2012 | Song et al. |
| 2012/0040720 A1 | 2/2012 | Zhang et al. |
| 2012/0050012 A1* | 3/2012 | Alsina ............ H04N 21/4126 340/10.1 |
| 2012/0054808 A1 | 3/2012 | Nijim |
| 2012/0057853 A1 | 3/2012 | Huber et al. |
| 2012/0089910 A1 | 4/2012 | Cassidy |
| 2012/0113964 A1 | 5/2012 | Petersen et al. |
| 2012/0117026 A1 | 5/2012 | Cassidy |
| 2012/0117193 A1 | 5/2012 | Phillips et al. |
| 2012/0117586 A1 | 5/2012 | McCoy et al. |
| 2012/0147825 A1 | 6/2012 | Hassan et al. |
| 2012/0159372 A1 | 6/2012 | Stallings et al. |
| 2012/0174204 A1 | 7/2012 | Sturm et al. |
| 2012/0185770 A1 | 7/2012 | Hwang et al. |
| 2012/0192071 A1 | 7/2012 | Millington |
| 2012/0202485 A1 | 8/2012 | Mirbaha et al. |
| 2012/0227076 A1 | 9/2012 | McCoy et al. |
| 2012/0233067 A1 | 9/2012 | Matthew et al. |
| 2012/0272062 A1 | 10/2012 | Lee et al. |
| 2012/0284423 A1 | 11/2012 | Weel |
| 2012/0304233 A1 | 11/2012 | Roberts et al. |
| 2012/0311094 A1 | 12/2012 | Biderman et al. |
| 2012/0311618 A1 | 12/2012 | Blaxland |
| 2013/0014015 A1 | 1/2013 | Lambourne |
| 2013/0024018 A1 | 1/2013 | Chang et al. |
| 2013/0047084 A1 | 2/2013 | Sanders et al. |
| 2013/0054742 A1 | 2/2013 | Tsuji et al. |
| 2013/0073584 A1 | 3/2013 | Kuper et al. |
| 2013/0086003 A1* | 4/2013 | Alsina ............ G06F 17/30578 707/690 |
| 2013/0111529 A1 | 5/2013 | Yao et al. |
| 2013/0151728 A1 | 6/2013 | Currier |
| 2013/0165164 A1 | 6/2013 | Rowe |
| 2013/0167029 A1 | 6/2013 | Friesen et al. |
| 2013/0173034 A1 | 7/2013 | Reimann et al. |
| 2013/0246916 A1 | 9/2013 | Reimann et al. |
| 2013/0254207 A1 | 9/2013 | Coburn, IV et al. |
| 2013/0300546 A1 | 11/2013 | Kim et al. |
| 2013/0326041 A1 | 12/2013 | Bellet et al. |
| 2013/0346859 A1 | 12/2013 | Bates et al. |
| 2013/0347117 A1 | 12/2013 | Parks et al. |
| 2014/0006483 A1 | 1/2014 | Garmark et al. |
| 2014/0006947 A1 | 1/2014 | Garmark et al. |
| 2014/0052770 A1 | 2/2014 | Gran et al. |
| 2014/0075308 A1 | 3/2014 | Sanders et al. |
| 2014/0080479 A1 | 3/2014 | Vangala et al. |
| 2014/0096166 A1 | 4/2014 | Gordon et al. |
| 2014/0108929 A1 | 4/2014 | Garmark et al. |
| 2014/0115462 A1 | 4/2014 | Reznor et al. |
| 2014/0122737 A1 | 5/2014 | Silberstein et al. |
| 2014/0123005 A1 | 5/2014 | Forstall et al. |
| 2014/0140530 A1 | 5/2014 | Gomes-Casseres et al. |
| 2014/0169569 A1 | 6/2014 | Toivanen et al. |
| 2014/0195587 A1 | 7/2014 | Sukoff et al. |
| 2014/0215009 A1 | 7/2014 | Zhang |
| 2014/0378056 A1 | 12/2014 | Liu |
| 2015/0026613 A1 | 1/2015 | Kwon et al. |
| 2015/0074527 A1 | 3/2015 | Sevigny et al. |
| 2015/0074528 A1 | 3/2015 | Sakalowsky et al. |
| 2015/0256954 A1 | 9/2015 | Carlsson et al. |
| 2015/0286360 A1 | 10/2015 | Wachter |

FOREIGN PATENT DOCUMENTS

| | | |
|---|---|---|
| WO | 0153994 | 7/2001 |
| WO | 2009086599 A1 | 7/2009 |
| WO | 2011049497 A1 | 4/2011 |
| WO | 2013049346 A1 | 4/2013 |
| WO | 2013101727 | 7/2013 |
| WO | 2014149533 A2 | 9/2014 |

OTHER PUBLICATIONS

Bluetooth. "Specification of the Bluetooth System: Wireless connections made easy" Core, Version 1.0 B, Dec. 1, 1999, 1076 pages.

Dell, Inc. "Dell Digital Audio Receiver: Reference Guide" Jun. 2000, 70 pages.

Dell, Inc. "Start Here" Jun. 2000, 2 pages.

Jo J., et al., "Synchronized One-to-many Media Streaming with Adaptive Playout Control," Proceedings of SPIE, 2002, vol. 4861, pp. 71-82.

Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages.

Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages.

Palm, Inc. "Handbook for the Palm VII Handheld" May 2000, 311 pages.

"Welcome. You're watching Apple TV." Apple TV 1st Generation Setup Guide, Apr. 8, 2008 <http://manuals.info.apple.com/MANUALS/0/MA403/en_US/AppleTV_SetupGuide.pdf> Retrieved Oct. 14, 2014, 40 pages.

"Welcome. You're watching Apple TV." Apple TV 2nd Generation Setup Guide, Mar. 10, 2011 <http://manuals.info.apple.com/MANUALS/1000/MA1555/en_US/Apple_TV_2nd_gen_Setup_Guide.pdf> Retrieved Oct. 16, 2014, 35 pages.

"Welcome. You're watching Apple TV." Apple TV 3rd Generation Setup Guide, Mar. 16, 2012 <http://http://manuals.info.apple.com/MANUALS/1000/MA1607/en_US/apple_tv_3rd_gen_setup.pdf> Retrieved Oct. 16, 2014, 35 pages.

"Presentations at WinHEC 2000" May 2000, 138 pages.

"International Search Report for Application No. PCT/US2014/039669, mailed on Sep. 22, 2014, 3 pages".

"Non-Final Office Action mailed on Mar. 2, 2015, issued in connection with U.S. Appl. No. 13/904,896, filed May 29, 2013, 15 pages".

""SonosTM Digital Music System User Guide", Version: 070101, Sonos, Inc., Jan. 2007, 179 pages".

"Written Opinion of the International Searching Authority for Application No. PCT/US2014/039669, mailed on Sep. 22, 2014, 5 pages".

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Motorola., "Simplefi, Wireless Digital Audio Receiver, Installation and User Guide", Dec. 31, 2001.

Prismiq; Inc., "Prismiq Media Player User Guide", 2003, 44 pages.

(56) References Cited

OTHER PUBLICATIONS

"UPnP; "Universal Plug and Play Device Architecture"; Jun. 8, 2000; version 1.0; Microsoft Corporation; pp. 1-54".
"Non-Final Office Action mailed on Mar. 13, 2015, issued in connection with U.S. Appl. No. 13/904,949, filed May 29, 2013, 20 pages".
Final Office Action mailed on Jun. 23, 2015, issued in connection with U.S. Appl. No. 13/904,896, filed May 29, 2013, 16 pages.
"Final Office Action mailed on Aug. 25, 2015, issued in connection with U.S. Appl. No. 13/864,081, filed Apr. 16, 2013, 15 pages.".
"Final Office Action mailed on Jul. 8, 2015, issued in connection with U.S. Appl. No. 14/520,566, filed Oct. 22, 2014, 8 pages.".
"Non-Final Office Action mailed on Aug. 19, 2015, issued in connection with U.S. Appl. No. 13/864,075, filed Apr. 16, 2013, 18 pages.".
"Non-Final Office Action mailed on May 28, 2015, issued in connection with U.S. Appl. No. 14/628,952, filed Feb. 23, 2015, 9 pages.".
Final Office Action mailed on Aug. 28, 2015, issued in connection with U.S. Appl. No. 13/904,936, filed May 29, 2013, 10 pages.
Non-Final Office Action mailed on Feb. 13, 2015, issued in connection with U.S. Appl. No. 13/904,936, filed May 29, 2013, 10 pages.
Non-Final Office Action mailed on Mar. 24, 2015, issued in connection with U.S. Appl. No. 13/864,086, filed Apr. 16, 2013, 14 pages.
"Advisory Action mailed on Oct. 16, 2013, issued in connection with U.S. Appl. No. 13/341,237, filed Dec. 30, 2011, 3 pages".
"Australian Intellectual Property Office, "Patent Examination Report No. 1", issued in connection with Australian patent application No. 2012362573, issued on Jan. 16, 2015, 3 pages".
"Final Office Action mailed on Apr. 22, 2015, issued in connection with U.S. Appl. No. 13/341,237, filed Dec. 30, 2011, 11 pages."
"Final Office Action mailed on Apr. 14, 2014, issued in connection with U.S. Appl. No. 13/341,237, filed Dec. 30, 2011, 12 pages".
"Final Office Action mailed on Aug. 6, 2013, issued in connection with U.S. Appl. No. 13/341,237, filed Dec. 30, 2011, 14 pages".
"International Preliminary Search Report for Application No. PCT/US2012/071212, mailed Jul. 10, 2014, 8 pages".
"International Search Report for PCT/US2014/034290 mailed Aug. 21, 2014".
"International Search Report for PCT/US2014/034292 mailed on Aug. 14, 2014".
"International Search Report for PCT/US2014/034372 mailed Aug. 20, 2014".
"Non-Final Office Action mailed on Mar. 10, 2015, issued in connection with U.S. Appl. No. 13/864,081, filed Apr. 16, 2013, 13 pages.".
"Non-Final Office Action mailed on Dec. 30, 2014, issued in connection with U.S. Appl. No. 14/520,566, filed Oct. 22, 2014, 10 pages".
"Non-Final Office Action mailed on Oct. 8, 2014, issued in connection with U.S. Appl. No. 13/341,237, filed Dec. 30, 2011, 12 pages".
"Non-Final Office Action mailed on Jan. 25, 2013, issued in connection with U.S. Appl. No. 13/341,237, filed Dec. 30, 2011, 9 pages".
"Non-Final Office Action mailed on Nov. 26, 2013, issued in connection with U.S. Appl. No. 13/341,237, filed Dec. 30, 2011, 15 pages".
""Sonos Multi-Room Music System User Guide," Version 090401, Sonos, Inc. Apr. 1, 2009, 256 pages".
""Sonos Wireless Dock Product Guide," Version 100101, Sonos, Inc. Oct. 10, 2001, 196 pages".
"Written Opinion of the International Searching Authority for PCT/US2014/034290 mailed Aug. 21, 2014".
"Written Opinion of the International Searching Authority for PCT/US2014/034292 mailed on Aug. 14, 2014".
"Written Opinion of the International Searching Authority for PCT/US2014/034372 mailed Aug. 20, 2014".
Advisory Action mailed on Dec. 2, 2015, issued in connection with U.S. Appl. No. 13/904,936, filed May 29, 2013, 4 pages.
"Advisory Action mailed on Dec. 16, 2015, issued in connection with U.S. Appl. No. 13/904,949, filed May 29, 2013, 11 pages.".
"Advisory Action mailed on Oct. 29, 2015, issued in connection with U.S. Appl. No. 13/864,081, filed Apr. 16, 2013, 3 pages.".
"Canadian Office Action mailed on Nov. 12, 2015, issued in connection with Canadian Application No. 2,861,790, 3 pages.".
Final Office Action mailed on Dec. 7, 2015, issued in connection with U.S. Appl. No. 13/864,075, filed Apr. 16, 2013, 16 pages.
International Bureau, International Preliminary Report on Patentability, mailed on Oct. 29, 2015, issued in connection with International Application No. PCT/US2014/034290, filed Apr. 16, 2014, 7 pages.
International Bureau, International Preliminary Report on Patentibility, mailed on Oct. 29, 2015, issued in connection with International Application No. PCT/US2014/034292, filed Apr. 16, 2014, 6 pages.
International Bureau, International Preliminary Report on Patentability, mailed on Oct. 29, 2015, issued in connection with International Application No. PCT/US2014/034372, filed Apr. 16, 2014, 8 pages.
"Japanese Office Action mailed on Oct. 20, 2015, issued in connection with Japanese Application No. 2014-550400, 8 pages.".
Non-Final Office Action mailed on Nov. 18, 2015, issued in connection with U.S. Appl. No. 13/904,896, filed May 29, 2013, 18 pages.
"Non-Final Office Action mailed on Nov. 18, 2015, issued in connection with U.S. Appl. No. 13/904,932, filed May 29, 2013, 12 pages.".
Non-Final Office Action mailed on Dec. 28, 2015, issued in connection with U.S. Appl. No. 14/520,566, filed Oct. 22, 2014, 10 pages.
Notice of Allowance mailed Oct. 9, 2015, issued in connection with U.S. Appl. No. 13/864,086, filed Apr. 16, 2013, 14 pages.
Pre-Interview First Office Action mailed on Dec. 22, 2015, issued in connection with U.S. Appl. No. 14/520,578, filed Oct. 22, 2014, 9 pages.
Supplemental Notice of Allowability mailed on Nov. 4, 2015, issued in connection with U.S. Appl. No. 13/864,086, filed Apr. 16, 2013, 2 pages.
"Advisory Action mailed on Sep. 17, 2015, issued in connection with U.S. Appl. No. 14/520,566, filed Oct. 22, 2014, 4 pages".
"European Patent Office, "The Extended European Search Report," issued in connection with Europea patent application No. 12861517.6, Jun. 9, 2015, 11 pages".
"Final Office Action mailed on Sep. 25, 2015, issued in connection with U.S. Appl. No. 13/904,949, filed May 29, 2013, 14 pages".
"Final Office Action mailed on Mar. 10, 2016, issued in connection with U.S. Appl. No. 13/904,932, filed May 29, 2013, 16 pages".
Notice of Allowance mailed on Feb. 26, 2016, issued in connection with U.S. Appl. No. 13/864,081, filed Apr. 16, 2013, 13 pages.
Final Office Action mailed on Mar. 21, 2016, issued in connection with U.S. Appl. No. 13/904,896, filed May 29, 2013, 19 pages.
Non-Final Office Action mailed on Mar. 17, 2016, issued in connection with U.S. Appl. No. 13/904,923, filed May 29, 2013, 15 pages.
"Non-Final Office Action mailed on Mar. 25, 2016, issued in connection with U.S. Appl. No. 13/904,949, filed May 29, 2013, 13 pages.".
Final Office Action mailed on Jan. 20, 2016, issued in connection with U.S. Appl. No. 14/628,952, filed Feb. 23, 2015, 10 pages.
Non-Final Office Action mailed on Feb. 2, 2016, issued in connection with U.S. Appl. No. 13/904,936, filed May 29, 2013, 14 pages.
Non-Final Office Action mailed on Jan. 19, 2016, issued in connection with U.S. Appl. No. 13/341,237, filed Dec. 30, 2011, 10 pages.
Advisory Action mailed on Jun. 16, 2016, issued in connection with U.S. Appl. No. 13/904,896, filed May 29, 2013, 5 pages.
Advisory Action mailed on Apr. 29, 2016, issued in connection with U.S. Appl. No. 13/864,075, filed Apr. 16, 2013, 3 pages.

(56) References Cited

OTHER PUBLICATIONS

European Patent Office, Exam Report mailed on Apr. 28, 2016, issued in connection with European Patent Application No. 12861517.6, 6 pages.
European Patent Office, Extended European Search Report mailed Jun. 7, 2016, issued in connection with European patent application No. 14803651.0, 10 pages.
Final Office Action mailed on Jun. 2, 2016, issued in connection with U.S. Appl. No. 14/520,566, filed Oct. 22, 2014, 12 pages.
Final Office Action mailed on May 19, 2016, issued in connection with U.S. Appl. No. 14/520,578, filed Oct. 22, 2014, 12 pages.
First Action Interview Office Action mailed on Jun. 20, 2016, issued in connection with U.S. Appl. No. 14/520,578, filed Oct. 22, 2014, 5 pages.
Non-Final Office Action mailed on Jun. 16, 2016, issued in connection with U.S. Appl. No. 13/904,932, filed May 29, 2013, 15 pages.
Notice of Allowance mailed on Jun. 13, 2016, issued in connection with U.S. Appl. No. 13/864,075, filed Apr. 16, 2013, 11 pages.
European Patent Office, Extended European Search Report mailed Aug. 1, 2016, issued in connection with European patent application No. 16160758.5, 11 pages.
Final Office Action mailed on Aug. 24, 2016, issued in connection with U.S. Appl. No. 13/341,237, filed Dec. 30, 2011, 12 pages.
Japanese Patent Office, Japanese Office Action mailed on Jul. 12, 2016, issued in connection with Japanese Application No. 2014-550400, 10 pages.
Non-Final Office Action mailed on Aug. 12, 2016, issued in connection with U.S. Appl. No. 13/904,909, filed May 29, 2013, 21 pages.
Non-Final Office Action mailed on Jul. 25, 2016, issued in connection with U.S. Appl. No. 14/628,952, filed Feb. 23, 2015, 12 pages.
Ritchie et al., "UPnP AV Architecture:2 For UPnP Version 1.0", 2010, XP055032201, retrieved from the internet: URL:http://upnp.org/specs/av/UPnP-av__AVArchitecture-v2.pdf, 11 pages.
Final Office Action mailed on Aug. 29, 2016, issued in connection with U.S. Appl. No. 13/904,936, filed May 29, 2013, 21 pages.
Notice of Allowance mailed on Aug. 31, 2016, issued in connection with U.S. Appl. No. 14/520,566, filed Oct. 22, 2014, 7 pages.

* cited by examiner

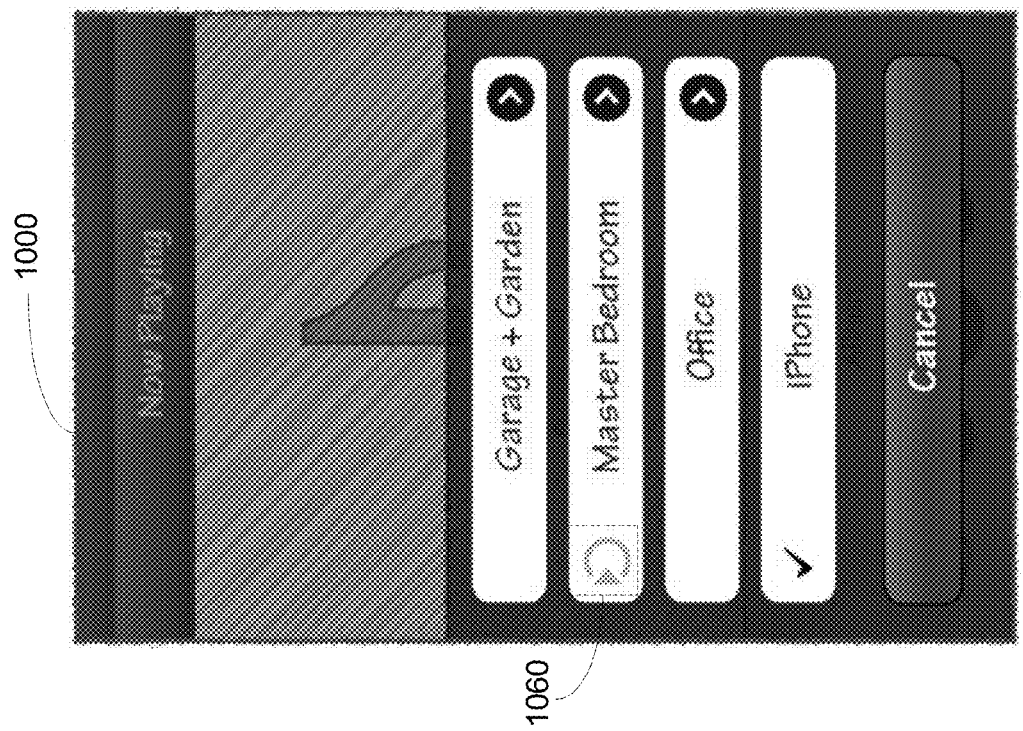
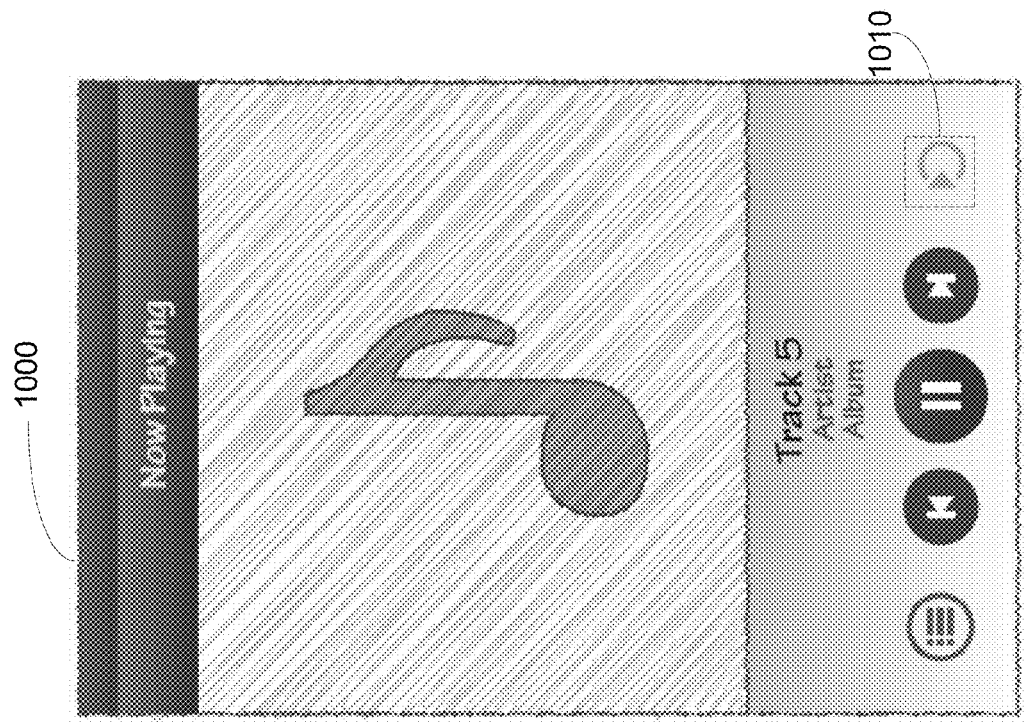
FIGURE 18B
FIGURE 18A

PLAYLIST MODIFICATION

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

FIGS. 18A-E show a series of example user interface for a second example of reconnecting a mobile device to a zone in a network media system;

Figure 1:
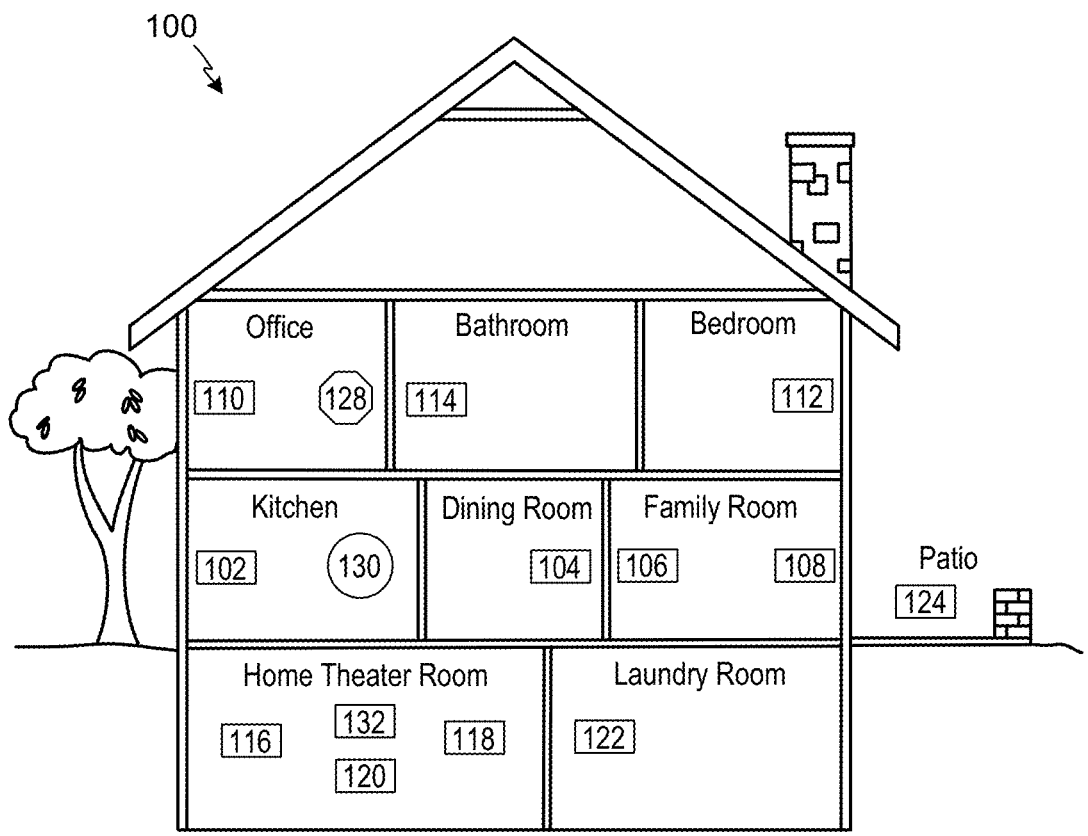
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein may involve a connected state between a mobile device and a zone in a network media system and interactions between the mobile device and the network media system involving the connected state. In one scenario, a user may be listening to music from a playlist on the mobile device while commuting home from work. Once the user is home and within communicative range of the network media system at home, the user may choose to "play to" a zone of one or more playback devices of the network media system via an interface on the mobile device. In embodiments described herein, "playing to" a zone may involve establishing a connected state between the mobile device and the zone.

The connected state may be established between the mobile device and the zone such that further actions taken on media items identified in the playlist on the mobile device may also be taken on corresponding media items in a playback queue associated with the zone. For instance, playing a particular song in the playlist via the mobile device may cause a corresponding particular song in the playback queue to also be played by the one or more playback devices in the zone. In another instance, removing the particular song from the playlist via the mobile device may cause the corresponding particular song to be removed from the playback queue associated with the zone. In some cases, establishing a connected state between the mobile device and the zone may involve populating the playback queue with media items corresponding to the media items identified in the playlist of the mobile device that the user wishes to play to the zone.

In some embodiments, the interface on the mobile device may be configured to display a connected state indicator. In one case, the connected state indicator may indicate that the mobile device is in a connected state with one or more zones in the network media system. In one instance, the connected state indicator may further indicate that a corresponding action has been taken on a corresponding media item in the playback queue as a result of an action taken on a media item identified in the playlist on the mobile device. In another case, a different indicator may be displayed to indicate that the mobile device is not currently in a connected state with a zone in the network media system, but that a connected state may be established.

In some cases, if the mobile device and the network media system are no longer in a communicative range of the network media system, such as when the user leaves the home with the mobile device, the mobile device may be configured to relinquish control of the zone such that the mobile device and the zone are no longer in the connected state. In these cases, embodiments described herein may involve transitioning control of the playback queue from the mobile device to another device in communication with the network media system.

After leaving the communicative range of the network media system and relinquishing control of the playback queue, the mobile device may at a later time re-enter the communicative range of the network media system. In this case, the mobile device may be configured to automatically reconnect with the zone. In one example, the mobile device may re-establish the connected state with the zone of the network media system. In another example, the mobile device may simply connect to the zone, and in some cases establish a new connected state, rather than re-establishing the previous connected state.

In some cases, modifications to the playlist may be made after the mobile device has relinquished control of the playback queue, and before the mobile devices has re-entered the communicative range of the network media system. In these cases, embodiments described herein may involve applying the same modifications to the playback queue.

In addition to interactions relating to establishing the connected state, relinquishing control of a playback queue, and re-establishing the connected state, embodiments described herein may further involve establishing the connected state with a second zone in the network media system and playing to the second zone. In one example, playing to the second zone may involve transferring control of the playback queue by the mobile device from the playback queue to the second playback queue, and subsequently relinquishing control of the playback queue.

In some cases, the network media system may be accessed by other mobile devices. In one instance, the playlist on the mobile device may be private and inaccessible to a second mobile device. Accordingly, the playback queue associated with the zone the mobile device is playing to may be private to the second mobile device. In this instance, an interface of the second mobile device may provide a private queue indicator to indicate that the zone may be associated with a private queue.

As indicated above, the present application involves embodiments for modifying a playlist. In one aspect, a method is provided. The method involves establishing a connected state between a mobile device and a zone of one or more playback devices in a network media system. The connected state of the mobile device with the zone indicates that an action taken on one or more media items identified in a playlist on the mobile device via the mobile device causes a corresponding action to be taken by the zone on a corresponding one or more media items in a playback queue associated with the zone. The method further involves disconnecting the mobile device from the network media system such that the mobile device and the zone are no longer in the connected state, providing the playlist for display on an user interface of the mobile device, receiving via the mobile device, a first user input indicating a modification to the playlist on the mobile device, determining that the connected state between the mobile device and the zone in the network media system is to be re-established, and responsively, sending to the zone, an update message indicating the modification to the playlist on the mobile device to cause a corresponding modification to be made to the playback queue associated with the zone.

In another aspect, a non-transitory computer readable memory is provided. The non-transitory computer readable memory has stored thereon instructions executable by a computing device to cause the computing device to perform functions. The functions include establishing a connected state between a mobile device and a zone of one or more playback devices in a network media system. The connected state of the mobile device with the zone indicates that an action taken on one or more media items identified in a playlist on the mobile device via the mobile device causes a corresponding action to be taken by the zone on a corresponding one or more media items in a playback queue associated with the zone. The functions further include disconnecting the mobile device from the network media system such that the mobile device and the zone are no longer in the connected state, providing the playlist for display on an user interface of the mobile device, receiving via the mobile device, a first user input indicating a modification to the playlist on the mobile device, determining that the connected state between the mobile device and the zone in the network media system is to be re-established, and responsively, sending to the zone, an update message indicating the modification to the playlist on the mobile device to cause a corresponding modification to be made to the playback queue associated with the zone.

In yet another aspect, a device is provided. The device includes a processor and memory having stored thereon instructions executable by the processor to perform functions. The functions include establishing a connected state between a mobile device and a zone of one or more playback devices in a network media system. The connected state of the mobile device with the zone indicates that an action taken on one or more media items identified in a playlist on the mobile device via the mobile device causes a corresponding action to be taken by the zone on a corresponding one or more media items in a playback queue associated with the zone. The functions further include disconnecting the mobile device from the network media system such that the mobile device and the zone are no longer in the connected state, providing the playlist for display on an user interface of the mobile device, receiving via the mobile device, a first user input indicating a modification to the playlist on the mobile device, determining that the connected state between the mobile device and the zone in the network media system is to be re-established, and responsively, sending to the zone, an update message indicating the modification to the playlist on the mobile device to cause a corresponding modification to be made to the playback queue associated with the zone.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
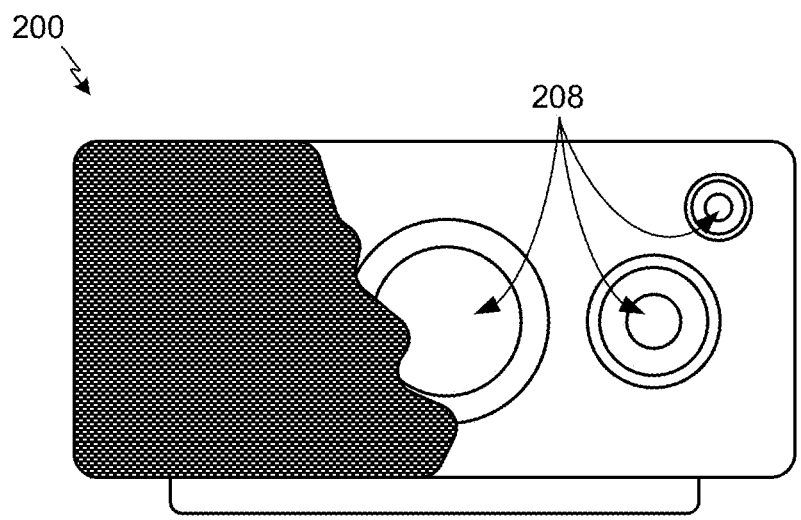
FIG. 2A shows an illustration of an example zone player having a built-in amplifier and transducers.
Figure 2B:
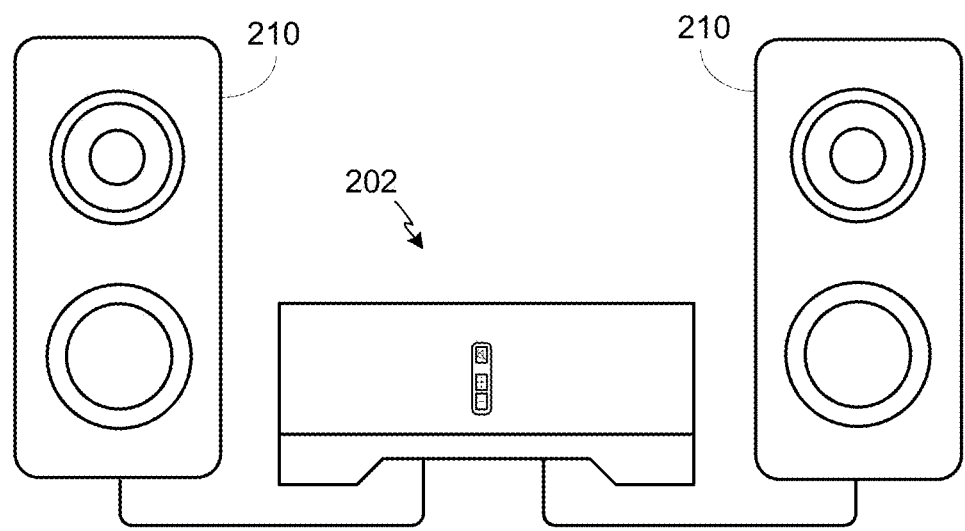
FIG. 2B shows an illustration of an example zone player having a built-in amplifier and connected to external speakers.
Figure 2C:
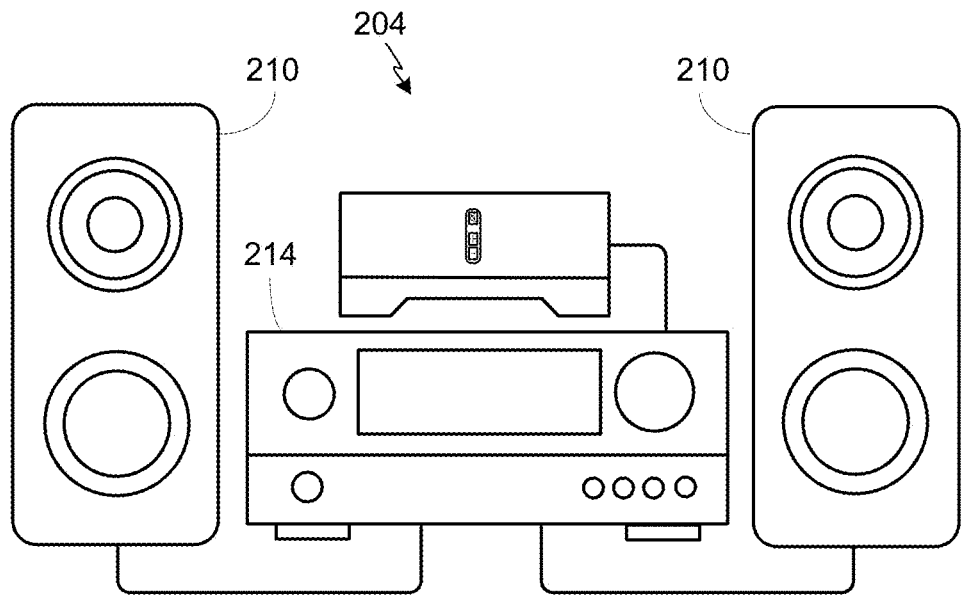
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
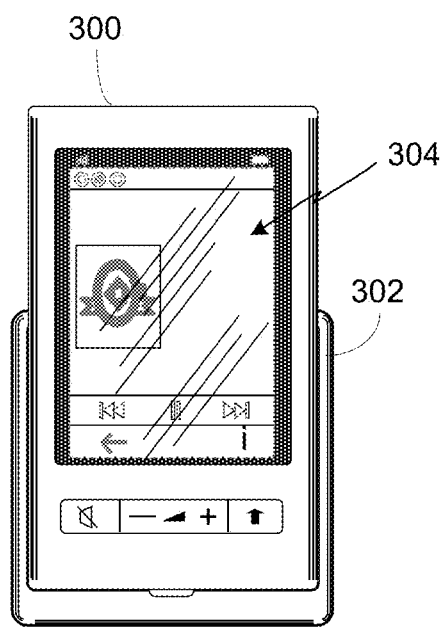
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" is a zone that contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
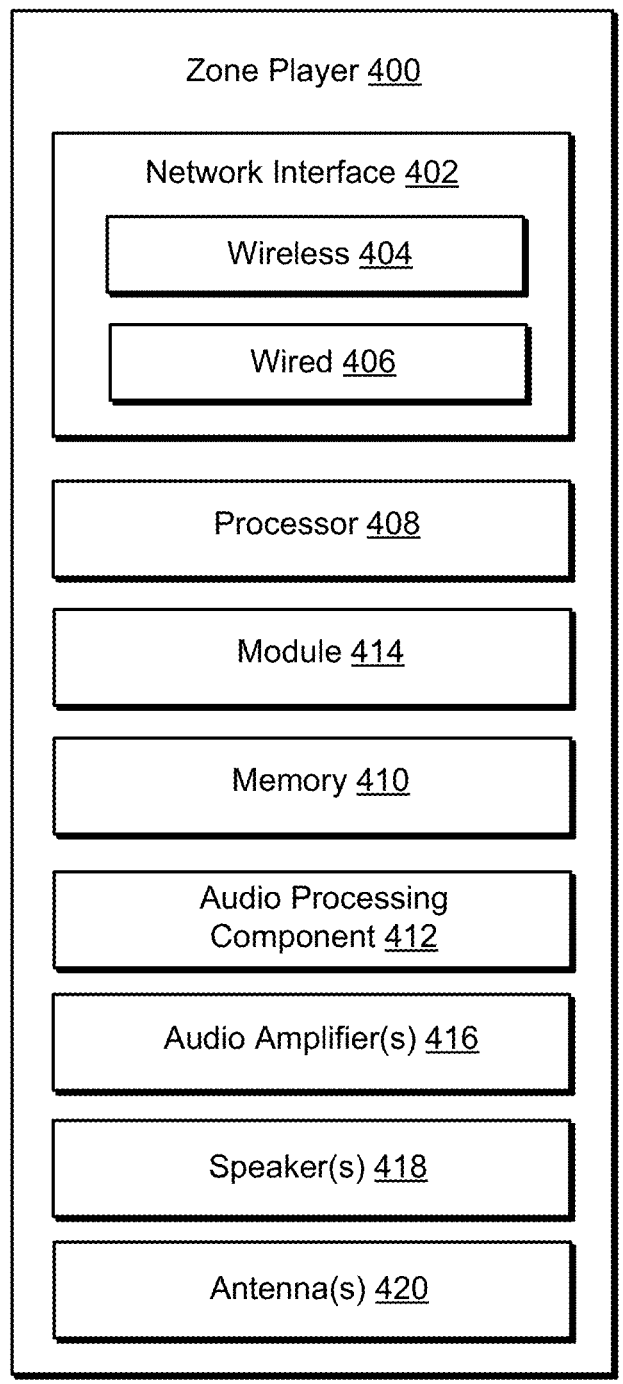
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
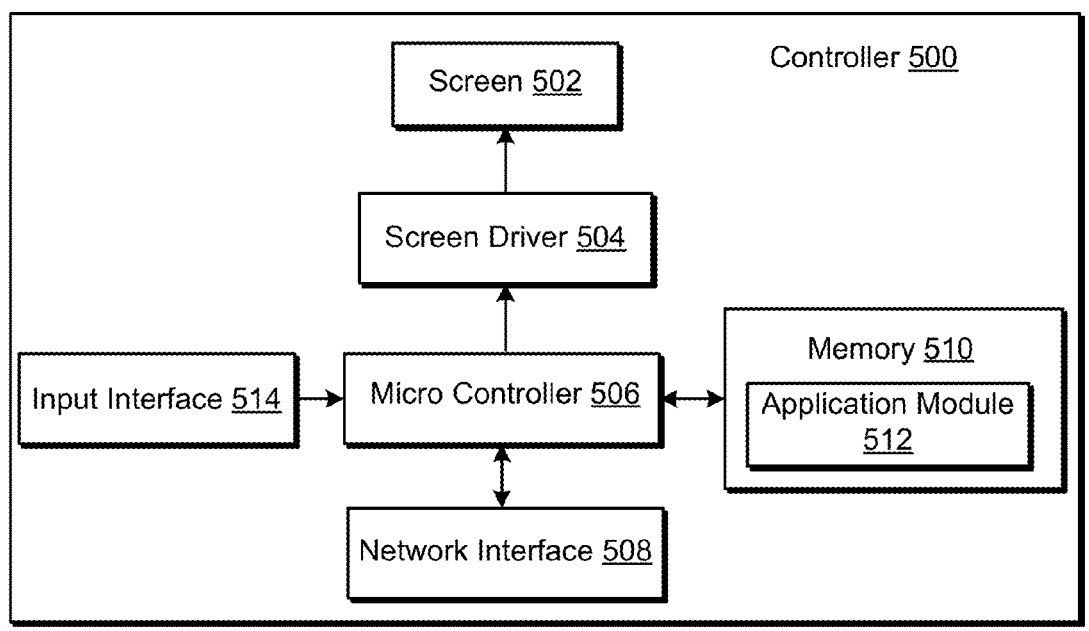
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+ dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/ rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
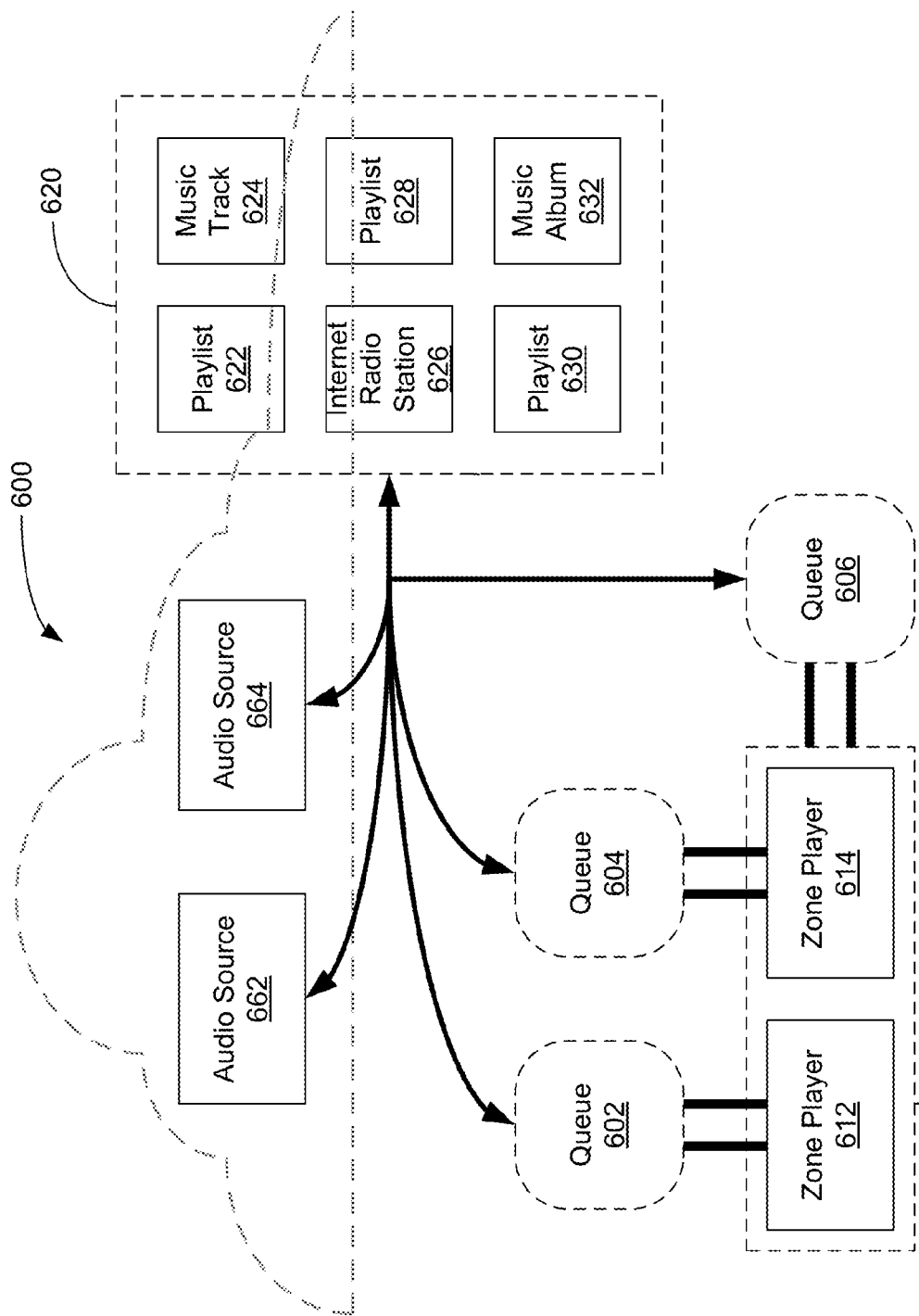
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, Internet radio station 626, playlists 628 and 630, and music album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 6. In some cases, the portions of the audio sources 662, 664, and example media items 620 may be stored locally on one or both of the zone players 612 and 614. In one embodiment, playlist 622, Internet radio station 626, and playlist 630 may be stored locally, and music track 624, playlist 628, and music album 632 may be stored on the cloud network.

Each of the example media items 620 may be a list of media items playable by a zone player(s). In one embodiment, the example media items may be a collection of links or pointers (i.e. URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio station 626 and music album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio station 626 and music album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the music album 632 may include pointers to items stored on audio source 662. Rather than adding links to the items on audio source 662, a link to the music album 632 may be added to the playback queue 602, such that the zone player 612 may play the items on the audio source 662 by accessing the items via pointers in the music album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
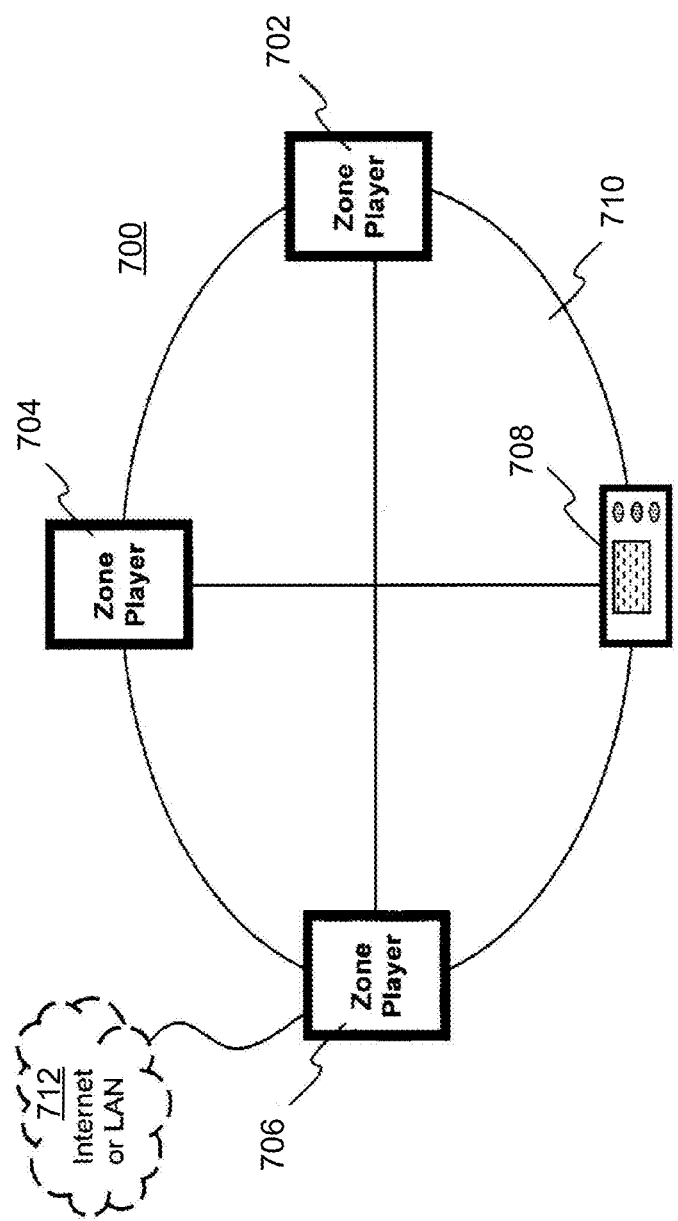
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 300) also running a CP application module, for example. The zone player is any other device on the network that is placed to participate in the automatic configuration process. The ZP, as a notation used herein, includes the controller 300 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11 g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
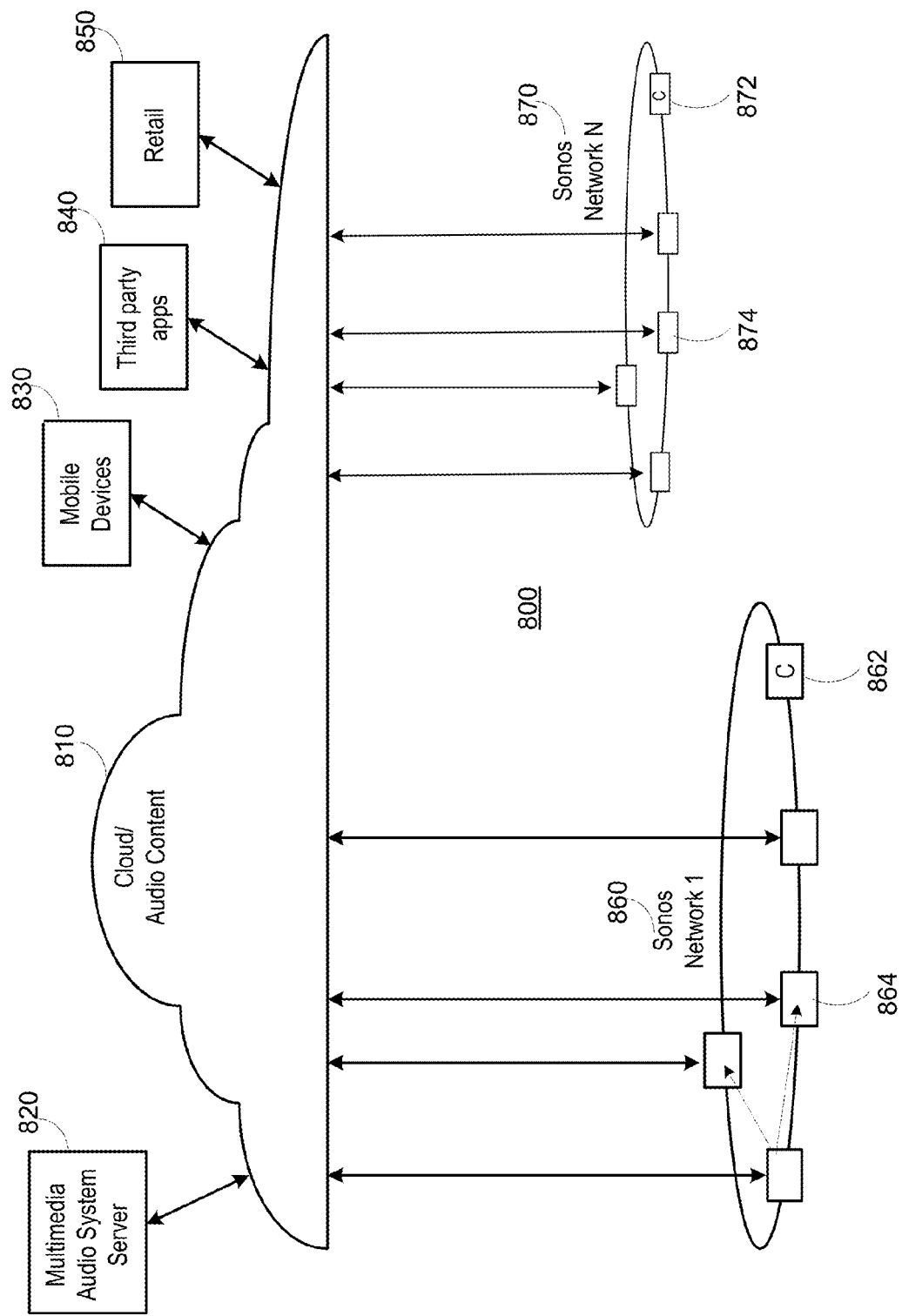
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VII. Example Playback Queue Control Via a Playlist on a Mobile Device

As discussed above, embodiments described herein may involve a connected state between a mobile device and a zone in a network media system. As previously discussed, the mobile device may be any network-capable device that may be used to play media items and that may be configured to be in communication with the network media system and one or more zones in the network media system. Also as previously discussed, each of the one or more zones in the network media system may include at least one playback device, and may be associated with a playback queue.

Figure 9:
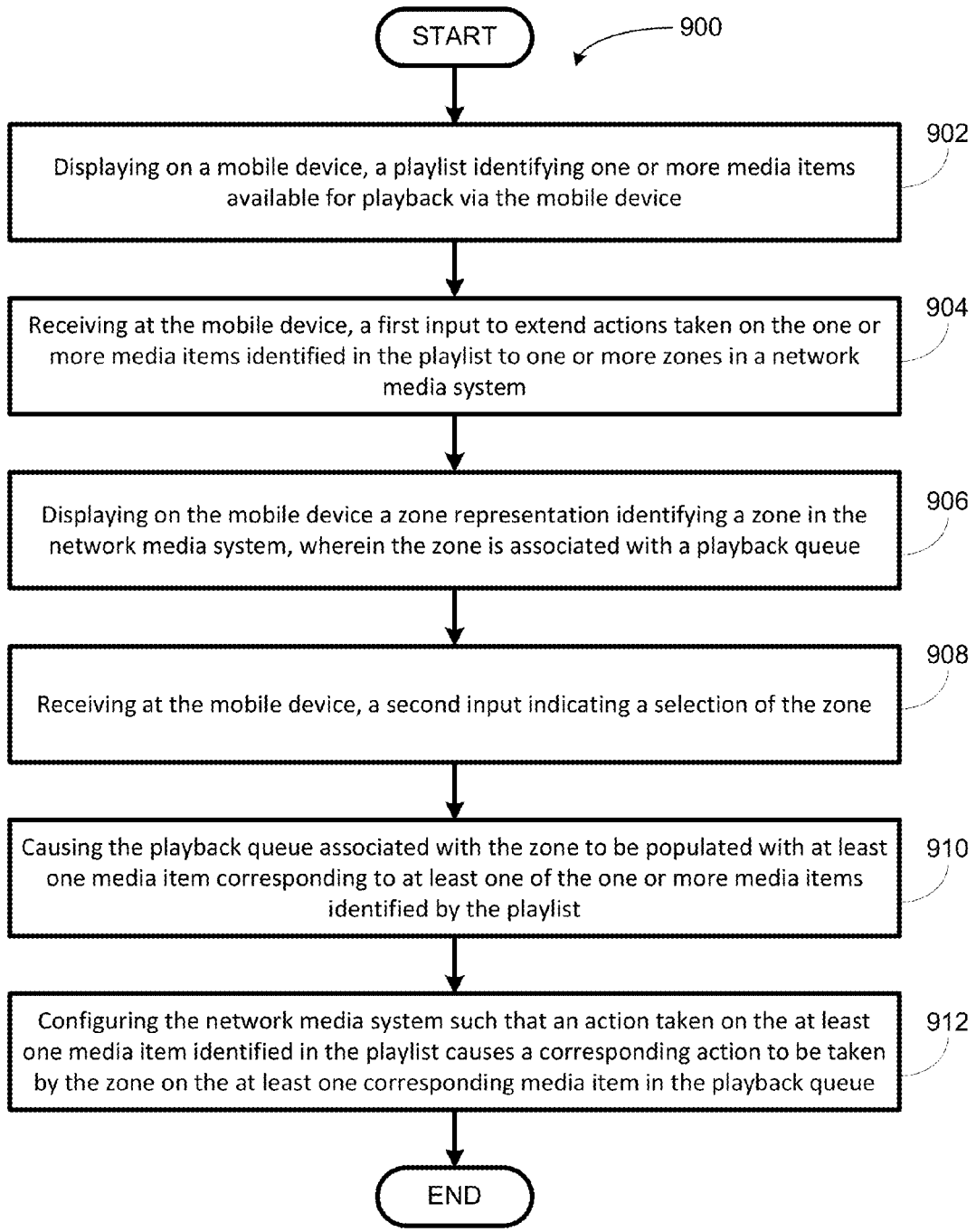
FIG. 9 shows an example flow diagram for establishing a connected state between a mobile device and a zone in a network media system.

FIG. 9 shows an example flow diagram for establishing a connected state between a mobile device and a zone in a network media system, in accordance with at least some embodiments described herein. Method 900 shown in FIG. 9 presents an embodiment of a method that could be used in the environments 100, 600, 700, and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-912. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 900 and other processes and methods disclosed herein, each block in FIG. 9 may represent circuitry that is wired to perform the specific logical functions in the process.

At block 902, method 900 involves displaying on a mobile device, a playlist identifying one or more media items available for playback via the mobile device. In one example, the playlist may be a list of links to media content accessible and playable by the mobile device. As such, the playlist may include one or more uniform resource identifiers (URIs) of the one or more media items identified in the playlist. In one case, the mobile device may be a smart phone that may be utilized as a controller device, similar to the controller 300 discussed above. In this case, the playlist may be displayed on an interface of the controller 300, such as the touch screen 304. The touch screen 304 may also be used by the user to provide inputs to the mobile device.

As previously mentioned, the information identifying one or more media items in the playlist may be stored on a remote server accessible over the Internet, a second mobile device in communication with the network media system, or a playback device in the zone of the network media system. Other storage options are also possible.

Figure 10B:
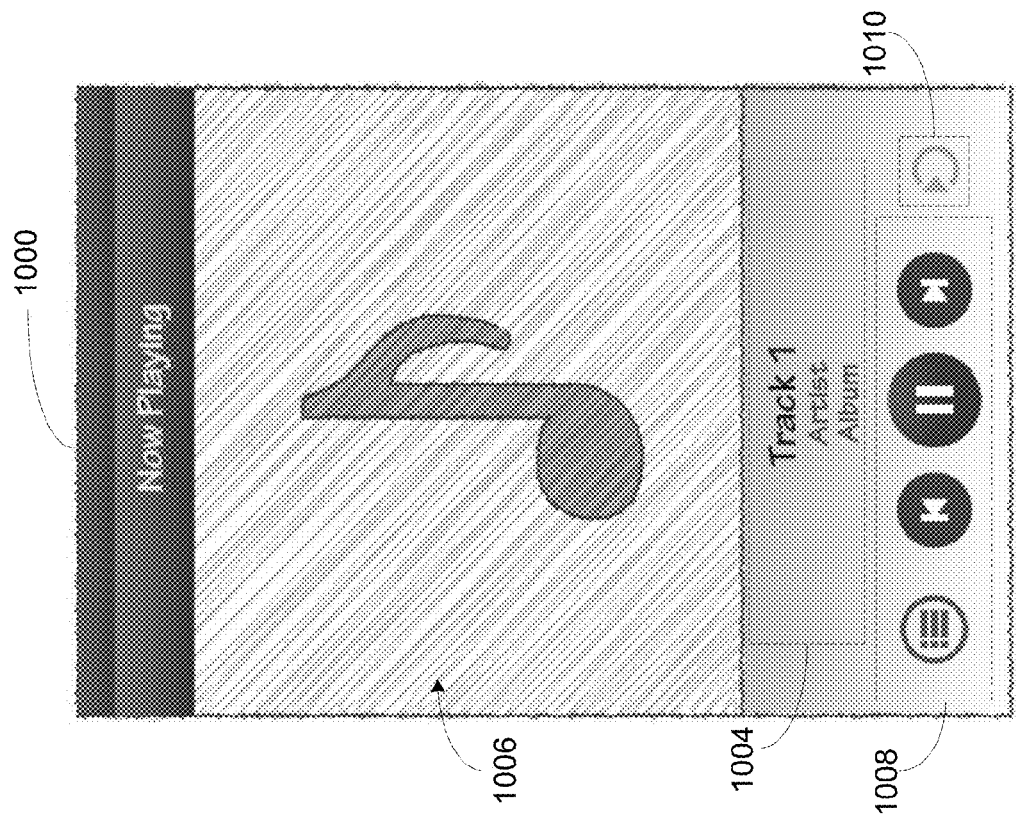
FIGS. 10A-10D show a series of example user interfaces for establishing a connected state between a mobile device and a zone in a network media system.
Figure 10A:
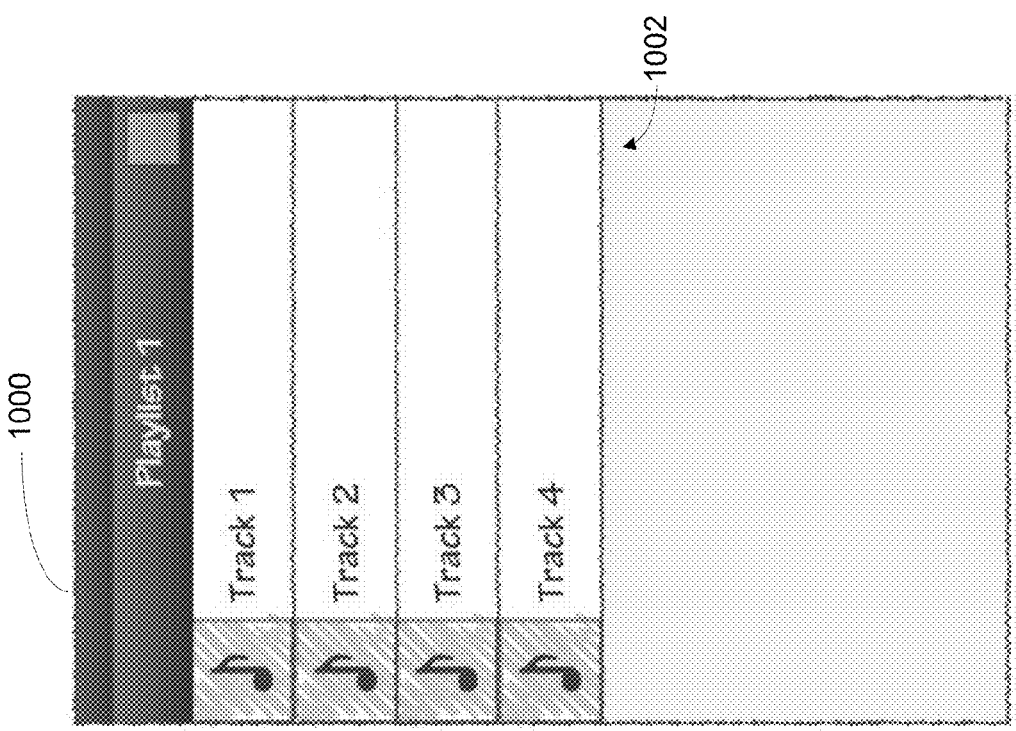
Figure 10D:
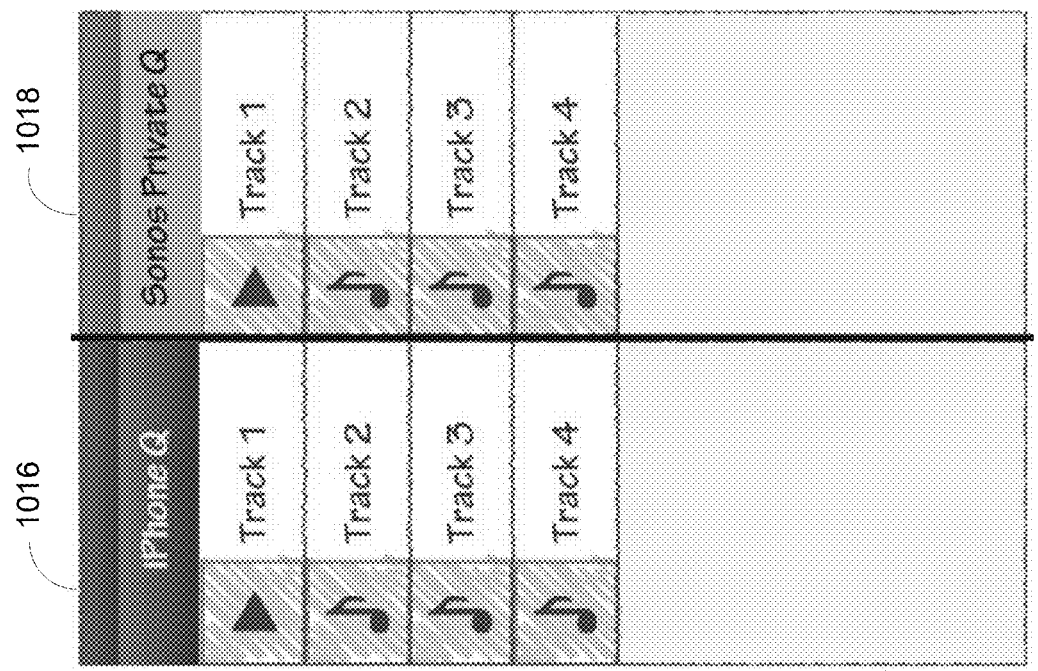
Figure 10C:
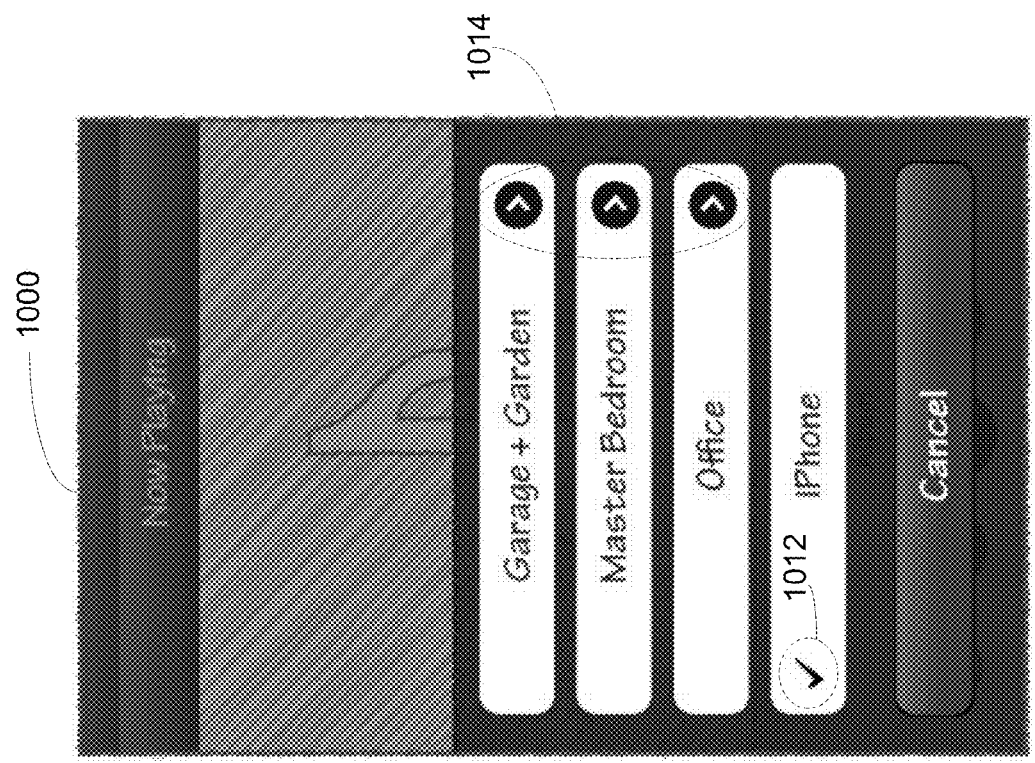

FIGS. 10A-10C show a series of example user interfaces 1000 for establishing a connected state between the mobile device and the zone in the network media system. The interface 1000 shown in FIG. 10A may include an example playlist 1002 that may be provided for display on the mobile device as discussed above. As shown, the playlist 1002 may include Track 1, Track 2, Track 3, and Track 4. In one example, the user using the mobile device may select Track 1. In the case the interface is a touch screen, the user may select Track 1 by a touch input on a graphical representation of Track 1. Upon receiving the selection of Track 1, the mobile device may be configured to begin playing Track 1.

During playback of Track 1, the interface 1000 of the mobile device may provide "Now Playing" information and playback control options, as shown in FIG. 10B. The "Now Playing" information may include a graphical representation 1006 for Track 1, such as album art for an album that includes Track 1, and data information 1004 for Track 1, such as a track title, a track artist, and/or a track album associated with Track 1. The playback control options may include graphical icons for pausing playback of Track 1, skipping forward to a next track in the playlist, or skipping back to a previous track in the playlist. The playback control options may also include a graphical icon for viewing a menu with additional options and/or actions that the user may take on Track 1 or the playlist.

The interface 1000 may further include a play-to icon 1010 to indicate an option to extend the playlist to a zone in the network media system. Referring back to FIG. 9 and method 900, block 904 may involve receiving at the mobile device, a first input to extend actions taken on the one or more media items identified in the playlist to one or more zones in a network media system. Accordingly, the first input may include a selection of the play-to icon 1010. In one example, the play-to icon 1010 may only be displayed, or may only be selectable if at least one zone in the network media system is available to be extended to.

Upon receiving the first input, which may include the selection of the play-to icon 1010, block 906 may involve displaying one or more zone representations on the interface 1000 of the mobile device, as shown in FIG. 10C. The zone representations may identify one or more zones from the one or more zones in the network media system, such as a "Garage+Garden" zone, a "Master Bedroom" zone, and an "Office" zone. In addition, the interface 1000 of FIG. 10C may display a graphical representation of the mobile device, which in this case, may be an "iPhone."

As shown in FIG. 10C, an icon 1012 overlaying the graphical representation of the mobile device may be displayed on the interface to indicate that the playlist on the mobile device is currently active. In one case, the icon 1012 may also indicate that a media item in the playlist on the mobile device is currently being played. Also shown in FIG. 10C are graphical icons 1014 overlaying the zone representations. In one example, the graphical icons 1014 may indicate that one or more of the zones are available for the currently active playlist to be extended to, and that a selection of one of the graphical icons 1014 may initiate an extension of the currently active playlist to a corresponding playback zone. In another example, the zone representations may be selectable to initiate an extension of the currently active playlist to a corresponding playback zone, while the graphical icons 1014 may be selectable to access an interface for configuring zone groups, as described in sections above. In some cases, the interface 1000 may further display, in response to receiving the first input, a graphical representation to inform the user of the option to extend the playlist. For instance, a textual message may be displayed to explicitly indicate that a selection of a zone representation on the interface may cause actions of the mobile device to be extended to the zone associated with the zone representation.

Referring back to method 900, block 908 may involve receiving at the mobile device, a second input indicating a selection of the zone. In one example, the zone representation for the "Master Bedroom" zone may be selected via the interface of the mobile device. In this case, the "Master Bedroom" zone may have been selected for the playlist on the mobile device to be extended to. In other words, the "Master Bedroom" zone may have been selected to be in a connected state with the mobile device.

As previously discussed, a connected state may be established between the mobile device and the zone such that further actions taken on media items identified in the playlist on the mobile device may also be taken on corresponding media items in a playback queue associated with the zone. Accordingly, at block 910, method 900 may involve causing the playback queue associated with the zone to be populated with at least one media item corresponding to at least one of the one or more media items identified in the playlist. As such, the playback queue associated with the "Master Bedroom" zone may be populated with at least one media items corresponding to the media items identified in the playlist on the mobile device in response to the "Master Bedroom" zone being selected to be in the connected state with the mobile device. In one case, a corresponding media item may be added to the playback queue for each media item identified in the playlist. In another case, corresponding media items may be added to the playback queue for only a subset of the media items identified in the playlist. In this case, the remaining corresponding media items may be added to the playback queue for the remaining media items at a later time. In some cases, media items already in the playback queue may be replaced by the media items identified in the playlist. In other words, media items already in the playback queue may be removed prior to adding the corresponding media items to the playback queue.

As mentioned above, the playlist may include one or more uniform resource identifiers (URIs) of the one or more media items identified in the playlist. In this case, causing the playback queue associated with the zone to be to be populated with at least one of the one or more media items identified in the playlist may involve the zone receiving and storing the one or more URIs. In one case, the mobile device may send the one or more URIs directly to one or more of the playback devices in the zone. In another case, the mobile device may send the one or more URIs to one or more playback devices in the zone via another device in the network media system.

As the playback queue associated with the zone, which in this case may be the "Master Bedroom" zone, is populated with the at least one corresponding media item, block 912 of method 900 may involve causing the network media system to be configured such that an action taken on the at least one media item identified in the playlist on the mobile device via the mobile device causes a corresponding action to be taken by the zone on the at least one corresponding media item in the playback queue, thereby establishing the connected state between the mobile device and the zone.

As shown and discussed in FIGS. 10A-10C, a connected state between the zone and the mobile device may be established after the mobile device is already playing a media content (Track 1) identified in the playlist. In one case, the connected state between the mobile device and the zone may involve transferring or moving the playback of Track 1 by the mobile device to the zone, such that playback by the mobile device may be stopped or muted, while playback of Track 1 by the zone begins. In one instance, playback of Track 1 by the zone may begin where playback of Track 1 by the mobile device was stopped or muted in a substantially seamless manner.

In another case, the connected state between the mobile device and the zone may involve the zone playing Track 1 in synchrony with the mobile device upon establishing the connected state, instead of playing Track 1 from the beginning. Similarly, if Track 2 is being played by the mobile device when the connected state is established, the zone may be configured to play Track 2 in synchrony with the mobile device instead of playing Track 1 from the beginning. In either case, a playback progress of the media content may be tracked and provided on an interface of the mobile device whether playback of the media content is in synchrony by the mobile device and the zone, or has been transferred from the mobile device to the zone. In embodiments discussed hereafter, a connected state between a mobile device and a zone may involve the mobile device and the zone playing media content in synchrony, or involve the mobile device displaying information for media content being played by the zone without also playing the media content.

In one example, the playback of Track 1 by the zone may be streamed from the mobile device upon initial establishment of the connected state. This may provide a more seamless extension of the playlist on the mobile device to the zone. As mentioned above, corresponding media items may initially be added to the playback queue for only a subset of the media items identified in the playlist, and the remaining corresponding media items may be added to the playback queue for the remaining media items at a later time. For instance, the remaining corresponding media items may not be added until a subsequent action is taken on media items identified in the playlist. In one case, a URI for Track 1 and Track 2 may be provided immediately, and the URIs for Track 3 and Track 4 may be provided at a later time.

In another case, no URI may be provided to the zone until an action is taken on a media item identified in the playlist to causing a corresponding action to be taken by the zone. For instance, upon establishing the connected state between the mobile device and the zone, the zone may play media items, in some cases in synchrony with the mobile device, by streaming the media content from the mobile device until an action is taken on a media item identified in the playlist after the connected state has been established. In one instance, a corresponding media item may be added to the playback queue of the zone for each media item identified in the playlist. In another instance, corresponding media items may be added to the playback queue for only the media items identified in the playlist relevant to the action taken.

The actions that may be taken on the at least one media item identified in the playlist may include playing one of the one or more media items in the playlist, pausing a playback of one of the one or more media items in the playlist, muting a playback of one of the one or more media items in the playlist, removing one of the one or more media items in the playlist, adding a media item to the one or more media items in the playlist, removing a media item from the one or more media items in the playlist, and playing a next media item in the one or more media items in the playlist.

FIG. 10D shows an example playlist 1016 on the mobile device next to an example playback queue 1018 associated with the zone, which in this case may be the "Master Bedroom" zone. As shown, the playlist 1016 and the playback queue 1018 include matching media items, and may both be indicating that Track 1 is currently playing. As indicated above, the zone may be playing Track 1 and the mobile device may be displaying the playback state as reflected in the playlist, or both the mobile device and the zone may be playing Track 1 in synchrony.

In one case, the side-by-side comparison of the playlist 1016 and the playback queue 1018 may be provided on the interface of the mobile device to provide the user information on media content being played by the mobile device and the zone while in the connected state. In another case, the interface may provide only the playlist 1016, similar to that shown in FIG. 10A, and not explicitly provide the playback queue 1018. In this case, a connected state icon, as will be discussed in the following section, may be provided to indicate that the mobile device and the zone are in a connected state such that the playback queue 1018 associated with the zone has been populated with media items corresponding to media items identified in the playlist 1016. As further shown in FIG. 10D, the playback queue 1018 may be identified as a private queue. In discussions herein, a private queue may be a playback queue containing content only accessible to users with access rights to the playback queue. Additional discussion relating to private queues may be found in sections below.

Other example methods, interactions and interfaces may also be possible.

VIII. Example Connected State Indicator

Figure 11:
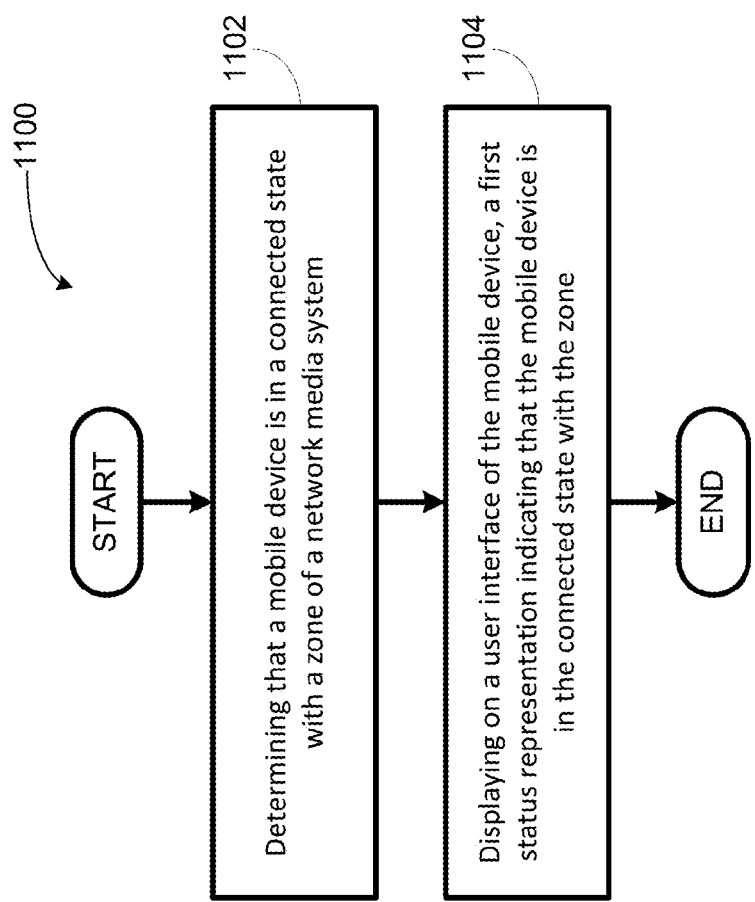
FIG. 11 shows an example flow diagram for providing an example connected state indicator.

As mentioned above, the interface on the mobile device may be configured to display a connected state indicator. FIG. 11 shows an example flow diagram for providing an example connected state indicator, in accordance with at least some embodiments described herein. Method 1100 shown in FIG. 11 presents an embodiment of a method that could be used in the environments 100, 600, 700, and 800 with the systems 200, 202, 204, 300, 400, and 500 for example, in communication with one or more devices, such as those illustrated in FIGS. 2-5. Method 1100 may include one or more operations, functions, or actions as illustrated by one or more of blocks 1102-1104. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 1102, method 1100 may involve determining that a mobile device is in a connected state with a zone of one or more playback devices in a network media system. As previously discussed, the connected state between the mobile device and the zone may be established such that an action taken on one or more media items identified in a playlist on the mobile device via the mobile device causes a corresponding action to the taken by the zone on a corresponding one or more media items in a playback queue associated with the zone. Also as previously discussed, the corresponding one or more media items populating the playback queue may be in the form of information identifying the one or more media items in playlist on the mobile device.

In one example, determining that the mobile device is in a connected state with the zone may involve receiving data confirming that a connected state has been established between the mobile device and the zone. In another example, determining that the mobile device is in a connected state with the zone may involve receiving a state variable from one or more playback devices in the zone indicating that the zone is in a connected state with the mobile device. As such, the state variable may indicate that an action taken on one or more media items identified in a playlist on the mobile device via the mobile device may cause a corresponding action to the taken by the zone on a corresponding one or more media items in the playback queue.

At block 1104, method 110 may involve displaying on a user interface of the mobile device, a first status representation indicating that the mobile device is in the connected state with the zone of the networked media system. As suggested previously, the user interface of the mobile device may be provided on a touch-sensitive screen, such as the touch screen 304 of the controller 300.

Figure 12:
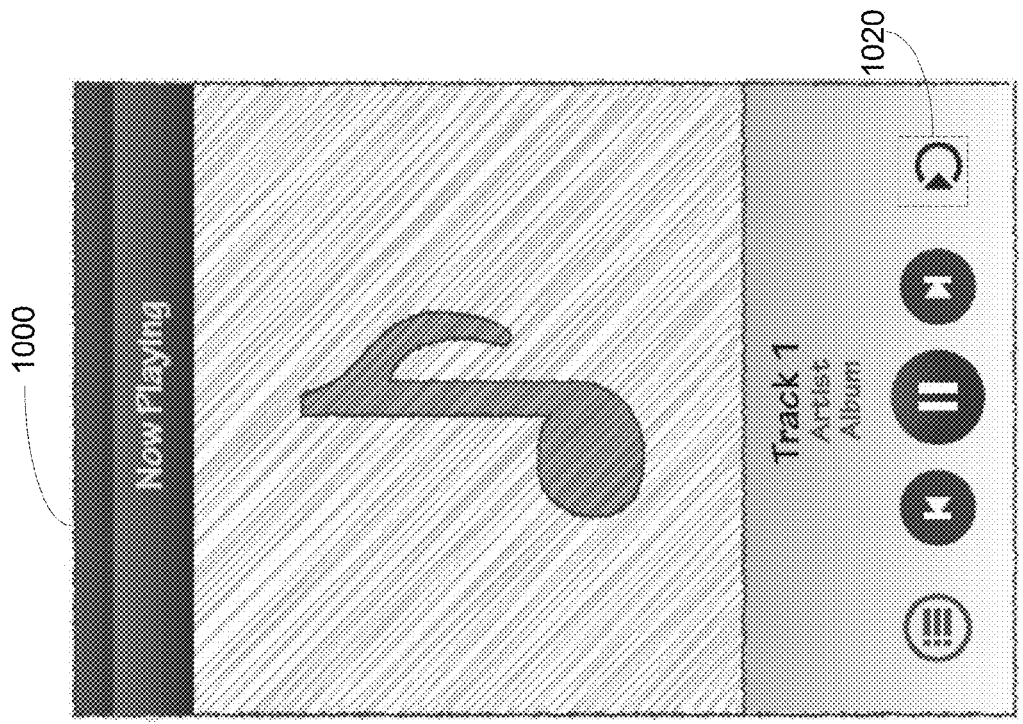
FIG. 12 shows an example user interface providing an example connected state indicator.

FIG. 12 shows an example user interface 1000 providing an example connected state indicator 1020 as the first status representation. As shown, the connected state indicator 1020 may be a modified version of the play-to icon 1010 shown in FIG. 10B. In this example, the connected state indicator 1020 may be a modified version of the play-to icon 1010 with higher color contrast. Also as shown, the connected state indicator 1020 may be displayed in the same, or substantially the same location on the user interface 1000 as the play-to icon 1010. As such, the connected state indicator 1020 may also be a selectable play-to icon such that the connected state indicator 1020 may be selected to extend the active playlist to another zone, while indicating that the mobile device providing the interface is in a connected state with a zone in the network media system, and that one or more other zones in the network media system may be available for extending the active playlist to.

In another example, as will be further discussed below, the mobile device may at some point after establishing the connected state with the zone, be no longer in the connected state with the zone. Responsive to determining that the mobile device is no longer in the connected state with the zone, the interface of the mobile device may display a second status representation indicating that the mobile device is not in the connected state with the zone. As such, the second status representation may indicate that the action taken via the mobile device on the one or more media items identified in the playlist on the mobile device will not cause the corresponding action to the taken by the zone on the corresponding one or more media items in the playback queue.

In one example, the second status representation indicating that the mobile device is not in the connected state with the zone may replace the first status representation on the mobile device. In one case, the second status representation may be displayed in the same, or substantially the same location on the user interface 1000 as the first status representation, which as shown in FIG. 12, may be the connected state indicator 1020. Further, the second status representation may be a modified version of the first status representation. For instance, the second status representation may be a dimmed version of the connected state indicator 1020. In one example, the second status representation may be the play-to icon 1010, which may accordingly indicate that the action taken via the mobile device on the one or more media items identified in the playlist on the mobile device will not cause the corresponding action to the taken by the zone on the corresponding one or more media items in the playback queue, while also indicating that one or more zones in the network media system are available to extend the active playlist to.

Other example methods, interactions and interfaces may also be possible.

IX. Example Playback Queue Control Transition

As mentioned previously, the mobile device may at some point after establishing the connected state with the zone, be no longer in the connected state with the zone. This may be if the user leaves the home with the mobile device. In such a case, embodiments described herein may involve the mobile device relinquishing control and transitioning control of the playback queue from the mobile device to another device in communication with the network media system.

Figure 13:
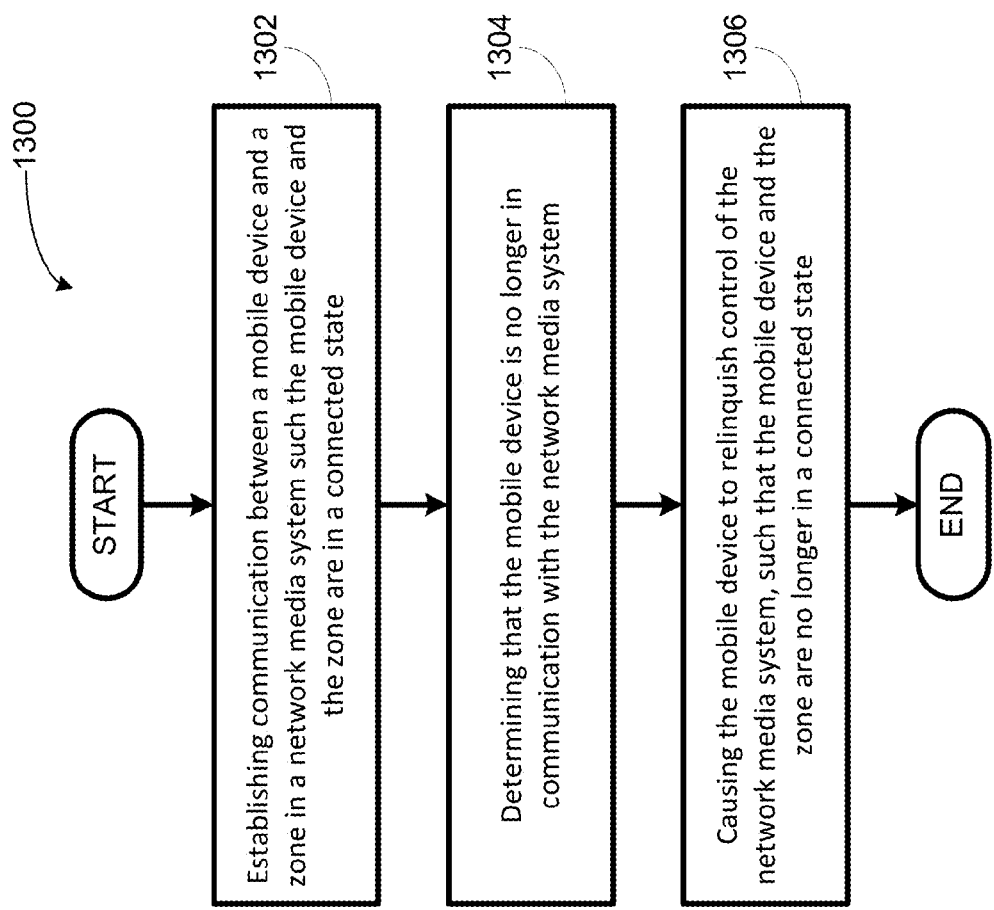
FIG. 13 shows an example flow diagram for transitioning control of a playback queue.

FIG. 13 shows an example flow diagram for transitioning control of a playback queue, in accordance with at least some embodiments described herein. Method 1300 shown in FIG. 13 presents an embodiment of a method that could be used in the environments 100, 600, 700, and 800 with the systems 200, 202, 204, 300, 400, and 500 for example, in communication with one or more devices, such as those illustrated in FIGS. 2-5. Method 1300 may include one or more operations, functions, or actions as illustrated by one or more of blocks 1302-1306. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 1302, method 1300 may involve establishing a connected state between a mobile device and a zone in a network media system such that an action taken on one or more media items identified in a playlist on the mobile device via the mobile device causes a corresponding action to be taken by the zone on a corresponding one or more media items in a playback queue associated with the zone. In other words, block 1302 may involve establishing a connected state between the mobile device and the zone in the network media system as discussed previously in connection to method 900 of FIG. 9.

As previously discussed, establishing communication between the mobile device and the zone of the network media system such that the mobile device and the zone are in a connected state may involve causing the playback queue associated with the zone of the network media system to be populated with at least one of the one or more media items identified in the playlist. In some cases, causing the playback queue associated with the zone of the network media system to be populated with at least one of the one or more media items identified in the playlist may further involve adding the information identifying one or more media items in the playlist to the playback queue. Also as discussed previously, the information identifying one or more media items added to the playback queue may be stored on a remote server accessible over the Internet, a second mobile device in communication with the network media system, or a playback device in the zone of the network media system.

At block 1304, method 1300 may involve determining that the mobile device is no longer in communication with the network media system. In one example, determining that the mobile device is no longer in communication with the network media system may involve sending a message from the mobile device to the network media system and receiving no response message. As suggested before, this may be the case if the user leaves the communicative range of the network media system with the mobile device.

At block 1306, method 1300 may involve causing the mobile device to relinquish control of the network media system, such that a further action taken on the one or more media items identified in the playlist via the mobile device does not cause a corresponding further action to be taken by the zone on the corresponding one or more media items in the playback queue associated with the zone. In one example, prior to determining that the mobile device is no longer in communication with the network media system, the mobile device may determine that communication with the network media system may soon be lost. This may be a determination that a signal strength between the mobile device and the network media system is becoming gradually weaker. Responsive to determining that communication with the network media system may soon be lost, a message may be sent to the network media system to cause the network media system to be reconfigured such that the further action taken on the one or more media items via the mobile device does not cause the corresponding further action to be taken on the corresponding one or more media items in the playback queue once the mobile device is no longer in communication with the network media system.

While the mobile device may naturally relinquish control of the zone in the network media system because the mobile device is no longer in communication with the network media system and may not effectively control the network media system or any zone in the network media system as a result, the mobile device may be configured to relinquish control of the network media system in response to determining that the mobile device is no longer in communication with the network media system such that both the mobile device and the network media system may continue operating in a substantially smooth and seamless manner.

In one example, after a connected state has been established between the mobile device and the zone of the network media system as discussed in connection to block 1302, and prior to determining that the mobile device is no longer in communication with the network media system as discussed in connection to block 1304, the mobile device may receive an input from a user to cause the action on a media item in the one or more media items identified in the playlist, and responsively, a corresponding action on the corresponding one or more media items in the playback queue may be taken.

As previously discussed, the actions that may be taken on the at least one media item identified in the playlist may include, for example, playing one of the one or more media items in the playlist, pausing a playback of one of the one or more media items in the playlist, muting a playback of one of the one or more media items in the playlist, removing one of the one or more media items in the playlist, adding a media item to the one or more media items in the playlist, removing a media item from the one or more media items in the playlist, and playing a next media item in the one or more media items in the playlist.

Accordingly, the corresponding action taken on the corresponding one or more media items in the playback queue may include playing the corresponding one or more media items, pausing playback of the corresponding one or more media items, muting playback of the corresponding one or more media items, removing the corresponding one or more media items from the playback queue, adding a new media item to the one or more corresponding media items in the playback queue, and playing a next media item in the one or more corresponding media items in the playback queue. In one case, an indication may be provided on the interface of the mobile device that an action has been taken on the one or more media items identified in the playlist on the mobile device, and that a corresponding action has accordingly been taken on the corresponding one or more media items in the playback queue associated with a zone of the network media system.

In one example, if a media item identified in the playlist and a corresponding media item in the playback queue are being played in synchrony when the mobile device and the network media system become no longer in communication, the mobile device may be configured to continue the action of playing the media item identified in the playlist despite the mobile device relinquishing control of the network media system. Similarly, the zone of the network media system may be configured to continue the corresponding action of playing the corresponding media item in the playback queue despite being no longer controlled by the mobile device.

In another example, the mobile device may be configured such that the action taken on the media item identified in the playlist and the corresponding action taken on the corresponding media item in the playback queue may be modified in response to determining that the mobile device is no longer in communication with the network media system. In one embodiment as discussed above, the connected state between the mobile device and the zone may involve only the zone playing the media content. In such a case, the mobile device may be configured to begin playing the media content in response to determining that the mobile device is no longer in communication with the network media system. In this case, the mobile device may substantially seamlessly begin playing the media content at where playback of the media item by the zone was when communication between the mobile device and the network media system was lost. Some other example modifications to the action taken on the media item identified in the playlist may include adjusting a playback volume of the media item being played, pausing playback of the media items, or muting playback of the media item. In one instance, a message may be sent by the mobile device to the network media system to cause the modification of the corresponding action upon determining that communication with the network media system may soon be lost. In one case, the action and the corresponding action may be modified similarly, while in another case, the action and the corresponding action may be modified differently.

Figure 14A:
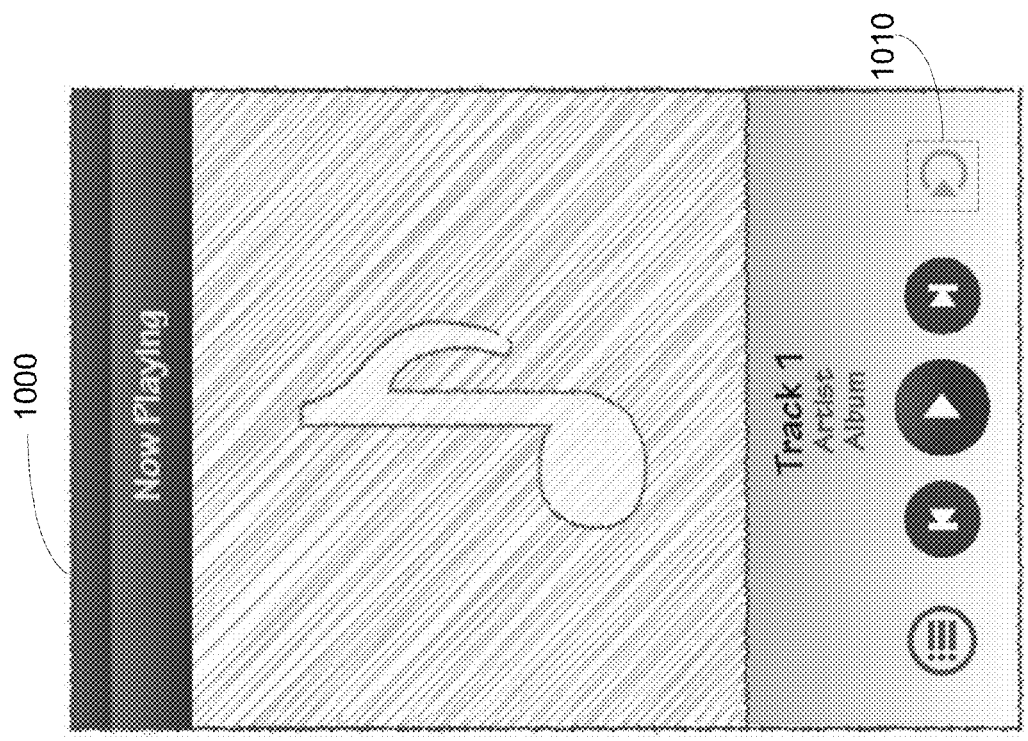
FIGS. 14A-B show a series of example user interfaces for transitioning control of a playback queue.
Figure 14B:
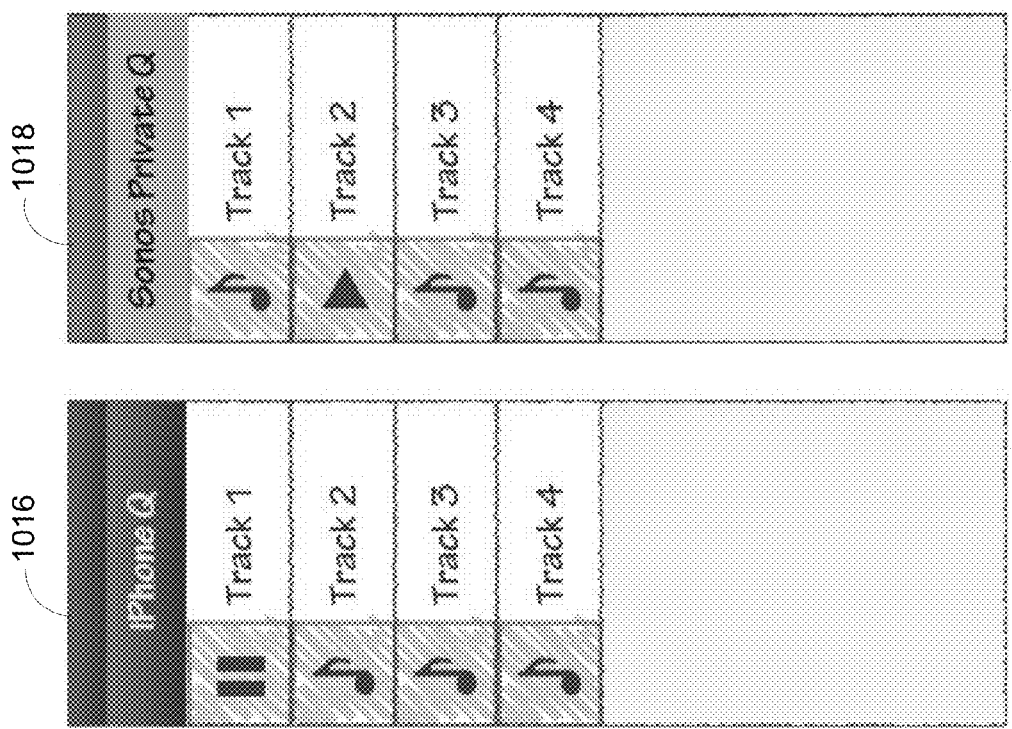

FIGS. 14A-B show a series of example user interfaces for transitioning control of a playback queue. Upon relinquishing control of the network media system, the mobile device may provide on the interface an indication that the mobile device has relinquished control of the network media system. As shown in FIG. 14A, and as discussed in the previous section, the indication may be a graphical representation such as the play-to icon 1010 as previously shown in FIG. 10B. Accordingly, the play-to icon 1010 may indicate that the action taken on the one or more media items identified in the playlist on the mobile device via the mobile device will no longer cause the corresponding action to the taken by the zone on the corresponding one or more media items in the playback queue.

FIG. 14B shows updated versions of example playlist 1016 and example playback queue 1018 previously shown in FIG. 10D, after the mobile device and the network media system have become disconnected. In this example, the mobile device may have been configured to modify the action taken on the media item Track 1 and pause the playback of the media item upon disconnecting from and relinquishing control of the network media system, while the zone in the network media system may have been configured to continue the corresponding action without modification. As shown, the zone may have continued to play media items in the playback queue and may have begun playing Track 2 upon completing playback of Track 1.

Other example methods, interactions and interfaces may also be possible.

X. Example Silent Connect

As mentioned previously, the mobile device may re-enter the communicative range of the network media system at a later time, after leaving the communicative range of the network media system and relinquishing control of the playback queue. In one case, the mobile device may be configured to automatically re-establish the connected state with the zone.

Figure 15:
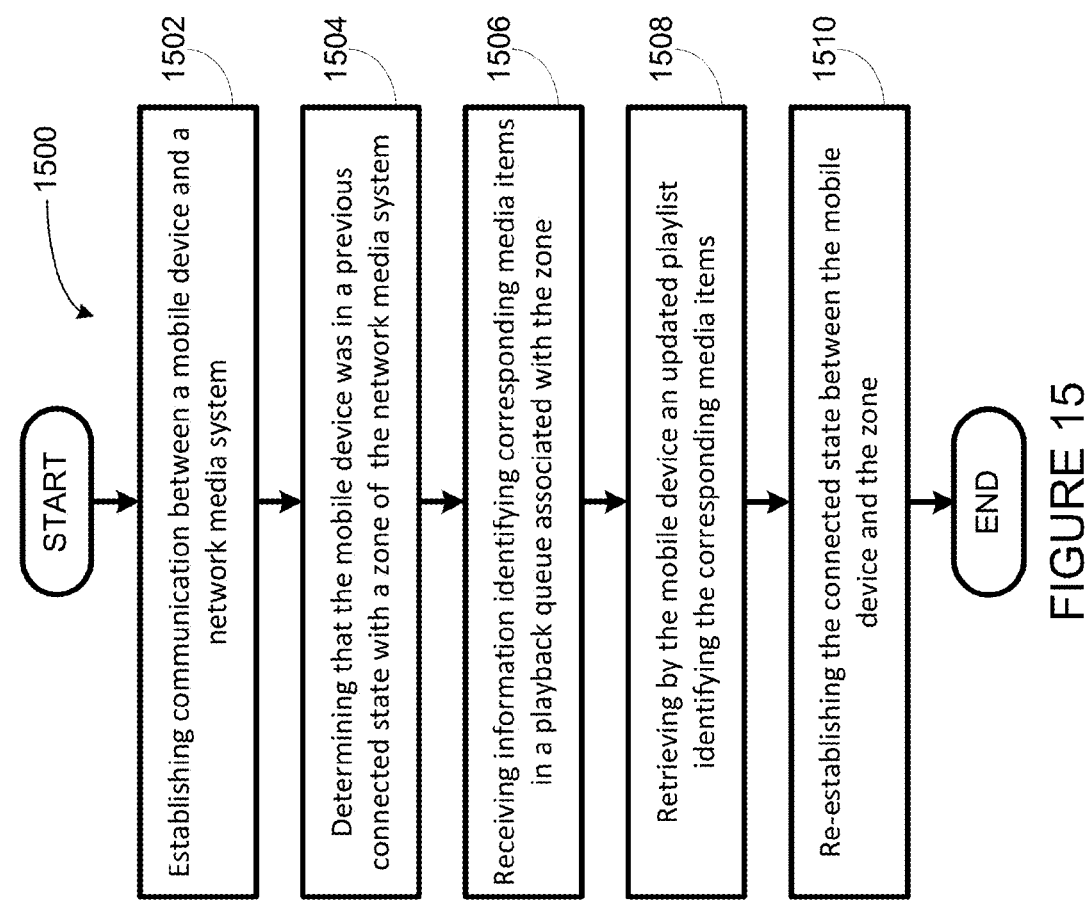
FIG. 15 shows a first example flow diagram for reconnecting a mobile device to a zone in a network media system.

FIG. 15 shows a first example flow diagram for reconnecting a mobile device to a zone in a network media system, in accordance with at least some embodiments described herein. Method 1500 shown in FIG. 15 presents an embodiment of a method that could be used in the environments 100, 600, 700, and 800 with the systems 200, 202, 204, 300, 400, and 500 for example, in communication with one or more devices, such as those illustrated in FIGS. 2-5. Method 1500 may include one or more operations, functions, or actions as illustrated by one or more of blocks 1502-1506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 1502, method 1500 may involve establishing communication between a mobile device and a network media system. As suggested previously, the mobile device may have re-entered the communicative range of the network media system. For instance, the user may have returned home with the mobile device. Accordingly, as the mobile device is once again in communicative range of the network media system, communication may be again established between the mobile device and the network media system.

Block 1504 of the method 1500 may involve determining that the mobile device was in a previous connected state with a zone of one or more playback devices in the network media system. As discussed above, the playback queue associated with the zone previously in a connected state with the mobile device may be a private queue as a result of being populated with media items corresponding to media items identified in the playlist on the mobile device. In such cases, determining that the mobile device was in a previous connected state with the zone may involve acquiring state variables from one or more playback devices in zones of the network media system and determining based on the acquired state variables that one of the zones in the network media system was in the previous connected state with the zone.

Determining that the mobile device was in a previous connected state with the zone may further involve determining that the playback queue associated with the zone was not modified after the mobile device relinquished control of the zone. In other words, if the playback queue has been modified, the playback queue may no longer be a private queue associated with the mobile device and the existence of a previous connected state may be obsolete. In such a case, the mobile device may simply establish a connected state with the zone according to method 900 of FIG. 9 rather than re-establish the connected state as currently discussed.

In one example, the zone may have continued to play corresponding media items in the playback queue associated with the zone after the mobile device relinquished control of the zone. In such a case, determining that the mobile device was in the previous connected state with the zone may involve determining that the zone is playing a particular media item from the associated playback queue that was populated with media items corresponding to media items identified in the playlist on the mobile device when the mobile device was in the previous connected state with the zone.

Upon determining that the mobile device was in a previous connected state with the zone, a determination may then be made as to whether the connected state with the zone may be automatically re-established. As will be further discussed below, the connected state may not be automatically re-established if the mobile device is playing a media item, or if the playback queue associated with the zone had been modified when communication with the network media system is established. Accordingly, determining whether a new connected state may be automatically re-established may involve determining that the mobile device is not playing back any media item.

As suggested previously, the mobile device may have been configured to modify the action taken on media items identified in the playlist by pausing playback of the media items upon relinquishing control over the network media system. In another case, the user may have paused playback of media items on the mobile device while the mobile device is not in communication with the network media system (and as a result, the pausing media playback did not cause pausing of the playback of corresponding media items in the playback queue associated with the zone.) Accordingly, the mobile device may not be playing any media items when communication with the network media system is re-established.

After determining that the connected state may be automatically re-established with the zone, block 1506 of method 1500 may involve receiving from the zone, information identifying the corresponding one or more media items in the playback queue. In one example, the information identifying the corresponding one or more media items in the playback queue may be received from the one or more playback devices of the zone.

Subsequently, block 1508 of method 1500 may involve retrieving by the mobile device an updated playlist identifying the corresponding one or more media items received from the zone, and at block 1510 of method 1500 may involve re-establishing the connected state between the mobile device and the zone such that an action taken on one or more media items identified in the updated playlist via the mobile device causes a corresponding action to the taken by the zone on the corresponding one or more media items in the playback queue associated with the zone.

In other words, as opposed to the embodiment discussed in connection to method 900 of FIG. 9 in which the playback queue of the zone is populated by media items corresponding to media items identified in the playlist on the mobile device, the retrieved playlist on the mobile device in this case may be generated from information identifying the corresponding media items in the playback queue associated with the zone. Effectively, the playlist on the mobile device may be updated, or in another sense, reverted back to the playlist that was active on the mobile device when the connected state with the zone was previously established.

Figure 16:
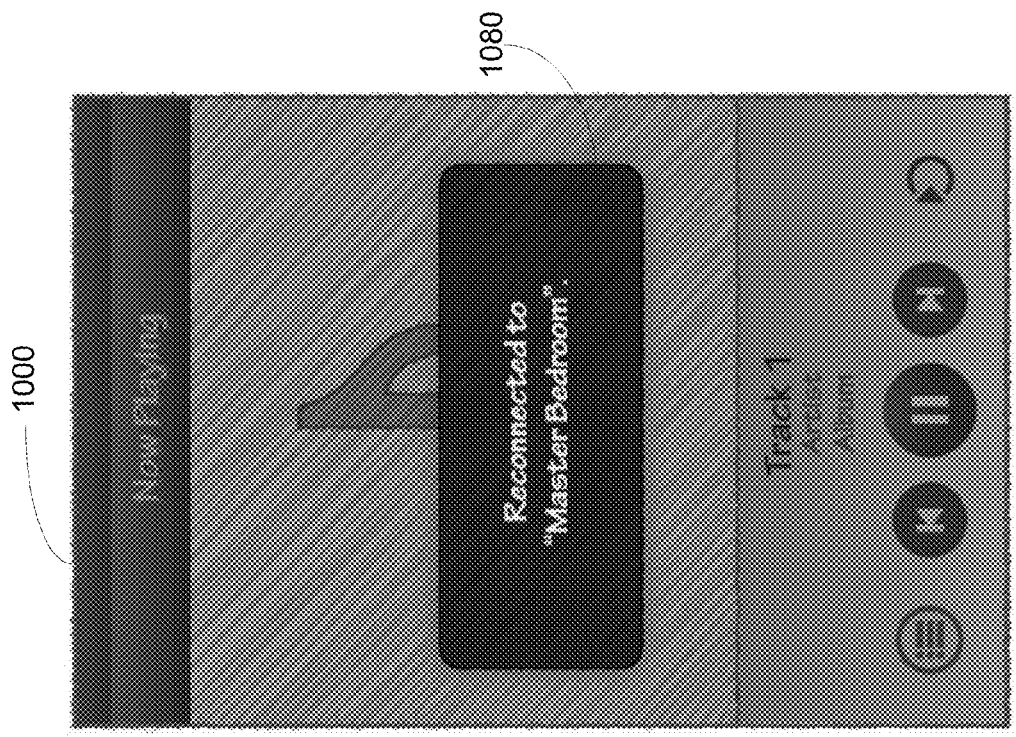
FIG. 16 shows an example user interfaces for a first example of reconnecting a mobile device to a zone in a network media system.

Once the connected state between the mobile device and the zone has been re-established, the interface of the mobile device may display a graphical representation 1080 as shown on the interface 1000 of FIG. 16 to indicate to the user that the connected state between the mobile device and the zone has been re-established. In this example, because the mobile device was previously in a connected state with the "Master Bedroom" zone, and has subsequently re-established the connected state, the graphical representation 1080 may indicate that the mobile device has reconnected with the "Master Bedroom" zone.

As discussed previously, the mobile device may in some cases be configured to only provide playback information of media items being played by the zone without playing the media items in synchrony with the zone. In some other cases, the media device may be configured to play media items in synchrony with the zone. Analogous to when a connected state is first established between the mobile device and the zone of the network media system, playback of media items by the mobile device and the zone may now be synchronized. However, because the zone may be playing a particular media item in the playback queue while the mobile device may not be playing any media item when the connected state is re-established, the mobile device may be configured to responsively play a media item from the update playlist corresponding to the particular media item played by the zone, in synchrony with the zone.

Figure 17:
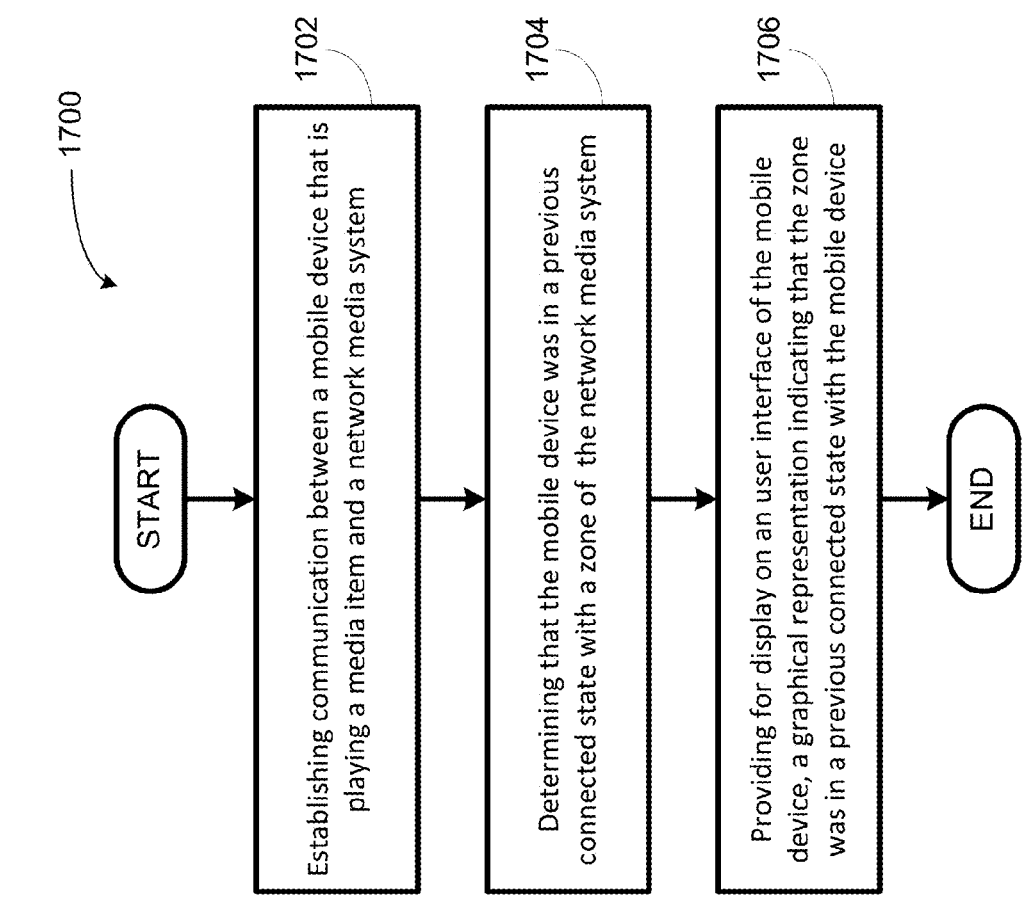
FIG. 17 shows a second example flow diagram for reconnecting a mobile device to a zone in a network media system.

In addition to method 1500 of FIG. 15, FIG. 17 shows a second example flow diagram for reconnecting a mobile device to a zone in a network media system, in accordance with at least some embodiments described herein. Method 1700 shown in FIG. 17 presents an embodiment of a method that could be used in the environments 100, 600, 700, and 800 with the systems 200, 202, 204, 300, 400, and 500 for example, in communication with one or more devices, such as those illustrated in FIGS. 2-5. Method 1700 may include one or more operations, functions, or actions as illustrated by one or more of blocks 1702-1706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 1702, method 1700 may involve establishing communication between a mobile device and a network media system, and block 1704 of method 1700 may involve determining that the mobile device was in a previous connected state with a zone of one or more playback devices in the network media system, similar to blocks 1502 and 1504 respectively, of method 1500.

As was the case with method 1500, if the mobile device was previously in a connected state with the zone of the network media system, the zone may still be taking the corresponding action on the corresponding media items in the playback queue associated with the zone as a result of an action taken on media items identified in the playlist on the mobile device. For instance, the zone may still be playing the corresponding media items in the queue as a result of media items identified in the playlist being played on the mobile device previously.

In contrast to the case of method 1500, the mobile device may be playing a media item when the mobile device re-establishes communication with the network media system. In one instance, the mobile device may have continued an action of playing media items identified in the playlist after relinquishing control of the network media system. In this case, however, playback of media items identified in the playlist may not be synchronized with a corresponding playback of corresponding media items in the playback queue associated with the zone the mobile device was previously in a connected state with, because the mobile device and the network media system were not in communication for a period of time.

In another instance, the mobile device may be configured to modify the action of the mobile device upon relinquishing control of the network media system, and playback of media items identified in the playlist may therefore not be synchronized with a corresponding playback of corresponding media items in the playback queue. In yet another instance, the user may have taken further actions on media items identified in the playlist on the mobile device such that playback of media items identified in the playlist may not be synchronized with a corresponding playback of corresponding media items in the playback queue.

Whichever the case, if the mobile device is playing a media item when communication with the network media system is re-established, a connected state with the zone of the network media system may not be re-established automatically. In the case of method 900 or method 1500 discussed previously, one of the active playlist or the active playback queue may be automatically applied or extended to the other, because the other may be inactive. In contrast, both the playlist on the mobile device and the playback queue associated with the zone in this case may be active, and accordingly, the connected state between the mobile device and the zone may not be re-established without an indication from the user as to which of the playlist and playback queue is to be applied or extended to the other.

As such, after determining that one of the zones in the network media system was in the previous connected state with the zone, block 1706 of method 1700 may involve providing for display on the user interface of the mobile device, a graphical representation indicating that the first zone was in a previous connected state with the mobile device to potentially prompt the user to provide an indication of how to proceed, rather than automatically re-establishing the connected state.

Figure 18D:
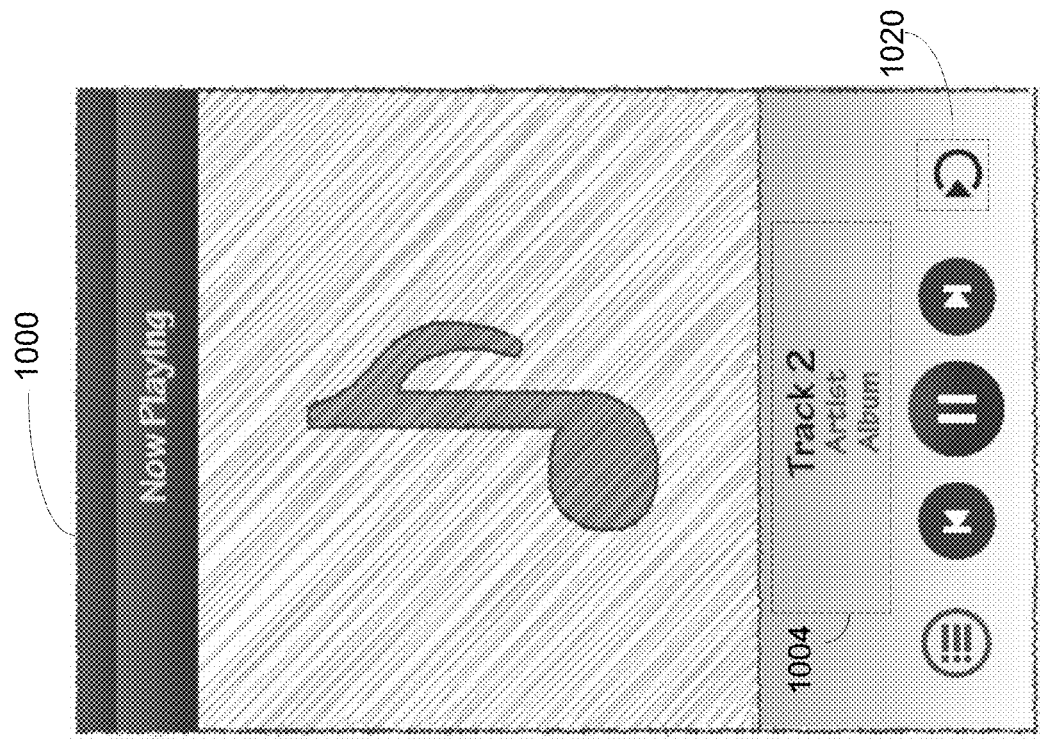

FIGS. 18A-E show a series of example user interfaces for a first example of re-connecting a mobile device to a zone in a network media system. FIG. 18A shows the example interface 1000 of the mobile device when communication with the network media system has been re-established. As shown, Track 5 may be playing on the mobile device, and the play-to icon 1010 may indicate that one or more zones in the network media system may be available for extending the playlist onto the mobile device.

In this case, the user may select the play-to icon 1010, and the interface 1000 as shown in FIG. 18B may be provided. As shown, graphical representations of the available zones are provided similar to that shown previously in FIG. 10C. In this case however, a previous connected state icon 1060 may be provided overlaying the graphical representation of the "Master Bedroom" zone indicating that the mobile device was previously in a connected state with the "Master Bedroom" zone, as discussed above in connection to block 1506 of method 1500.

From the interface 1000 shown in FIG. 18B, the user may choose to establish a connected state between the mobile device and any of the zones graphically represented on the interface as previously discussed in connection to method 900 of FIG. 9. For instance, the mobile device may receive an input indicating a selection of one of the graphically represented zones. In one case, the selected zone may be the "Office" zone, and subsequently a playback queue associated with the "Office" zone may be populated with media items corresponding to the one or more media items identified in the playlist currently being played by the mobile device, and the network media system may be configured such that an action taken on the one or more media items identified in the playlist via the mobile device causes a corresponding action to be taken on the corresponding one or more media items in the playback queue associated with the "Office" zone.

Figure 18C:
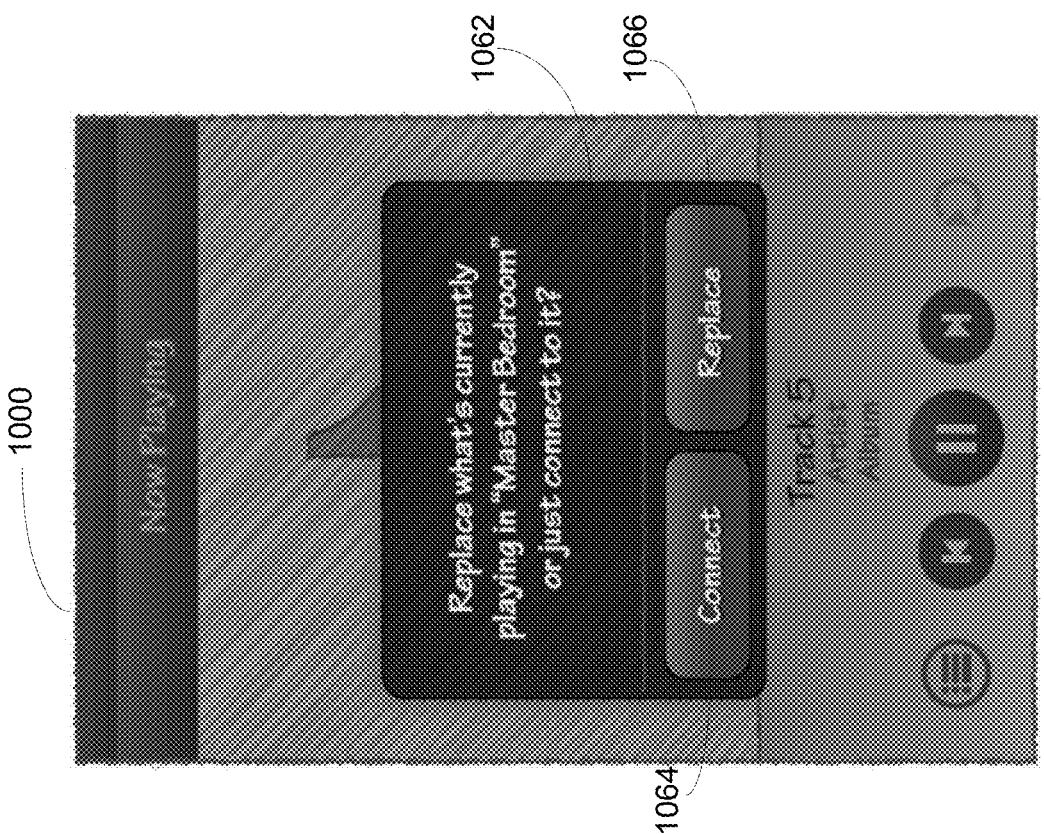

In another case, the selected zone may be the "Master Bedroom" zone, which the mobile device was previously in a connected state with. In this case, the interface 1000 as shown in FIG. 18C may display a confirmation prompt 1062 with a connect icon 1064 and a replace icon 1066. The confirmation prompt 1062 may be displayed to prompt the user to indicate whether the mobile device should connect to the "Master Bedroom" zone, or replace what is playing in the "Master Bedroom" zone, as previously discussed.

If the user selects the connect icon 1064 to connect to the "Master Bedroom" zone, the connected state between the mobile device and the "Master Bedroom" zone may be re-established similar to that described above in connection to method 1500 where the active playback queue associated with the "Master Bedroom" zone may be applied or extended to the mobile device. In this case, if the "Master Bedroom" zone is currently playing Track 2, then the mobile device may stop playing Track 5 and display information identifying Track 2. In some embodiments, the mobile device may be configured to begin playing Track 2 in synchrony with the "Master Bedroom" zone. In some other embodiments, the mobile device may display information identifying Track 2 without playing Track 2 in synchrony with the "Master Bedroom" zone. In either case, the interface 1000 as shown in FIG. 18D may display data information 1004 identifying Track 2 as the media item currently being played, and connected state indicator 1020 indicating that mobile device is now in a connected state. In this example, playback of Track 2 by the "Master Bedroom" zone may be uninterrupted.

Figure 18E:
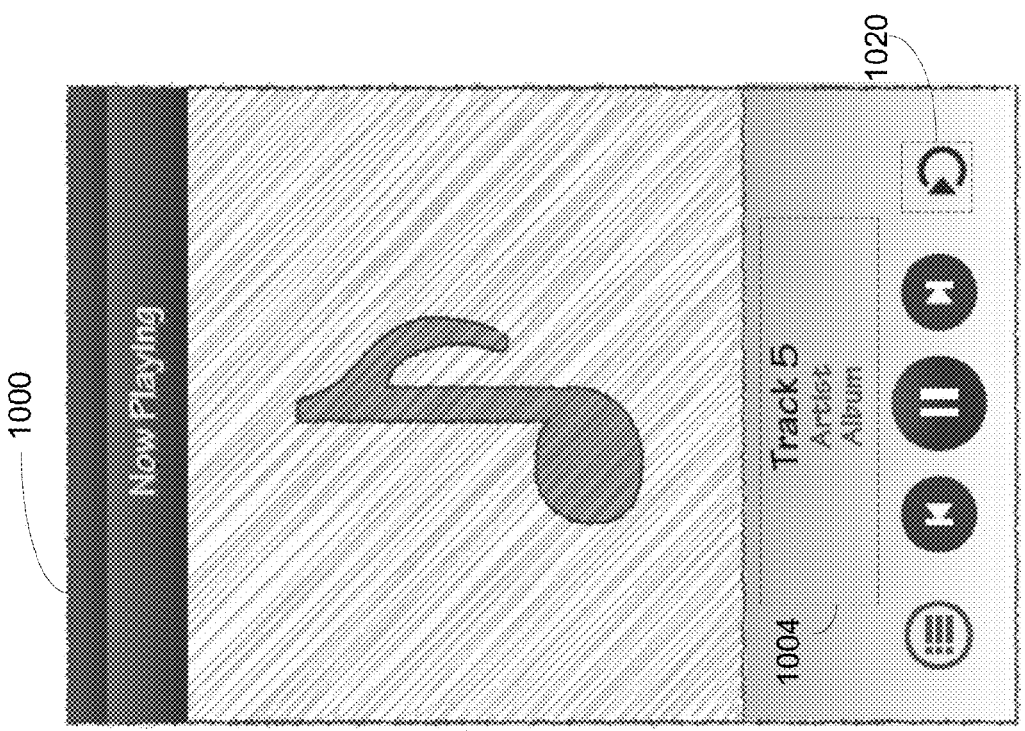

Referring back to FIG. 18C, if the user instead selects the replace icon 1066 to replace what is currently playing in the "Master Bedroom" zone, the connected state between the mobile device and the "Master Bedroom" zone may be re-established similar to that described above in connection to method 900 where the active playlist on the mobile device may be applied or extended to the "Master Bedroom" zone. In this case, because the mobile device is playing Track 5, the "Master Bedroom" zone may stop playing Track 2 and begin playing Track 5. In one case, the "Master Bedroom" zone may play Track 2 in synchrony with the mobile device. In another case, the mobile device may stop playing Track 5 when the "Master Bedroom" zone begins playing Track 5. In either case, the interface 1000 as shown in FIG. 18E may display data information 1004 identifying Track 5 as the media item currently being played, and connected state indicator 1020 indicating that mobile device is now in a connected state. In this example, playback of Track 5 by the mobile device may be uninterrupted.

Other example methods, interactions and interfaces may also be possible.

XI. Example Playlist Modification

Figure 19:
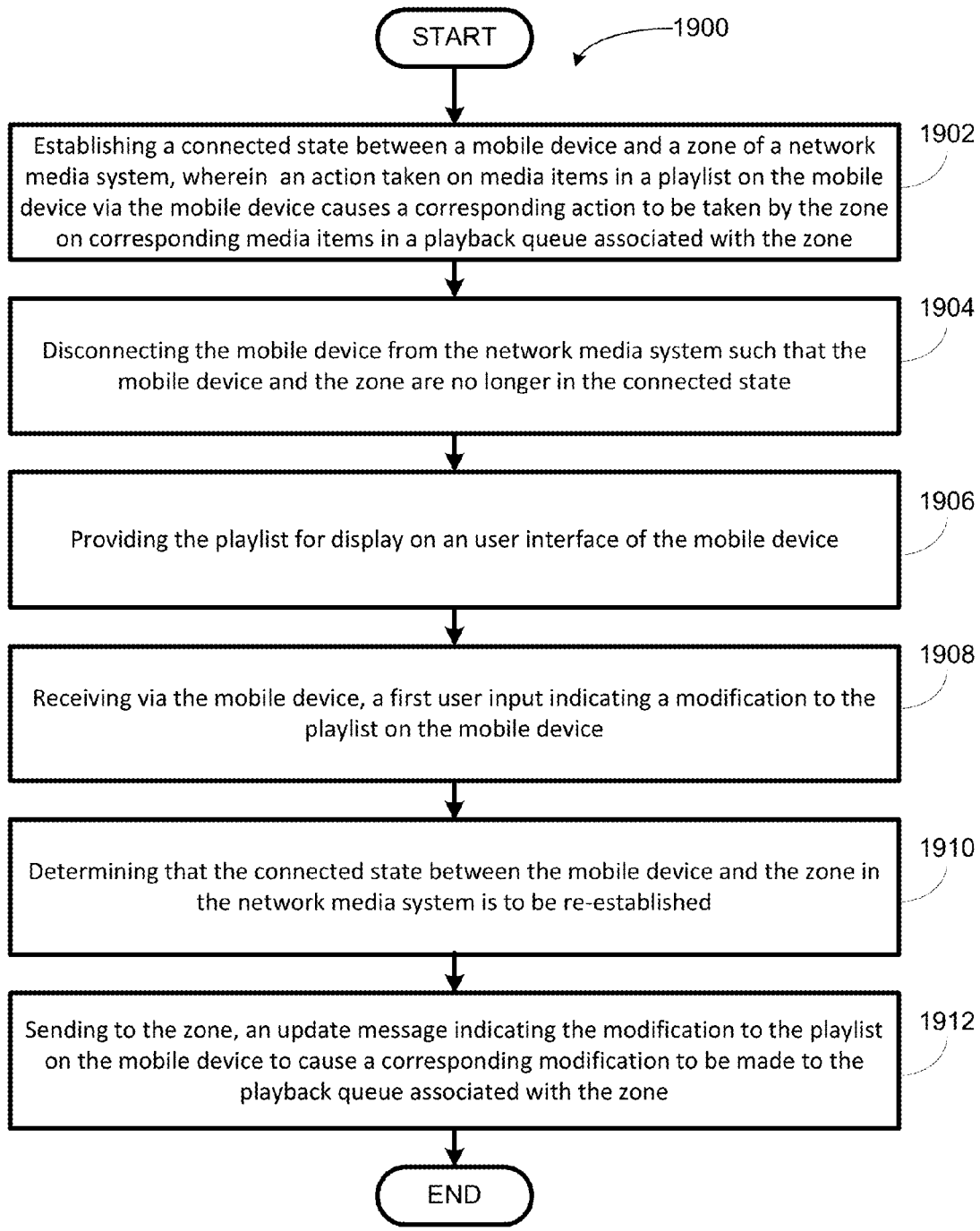
FIG. 19 shows an example flow diagram for modifying a playback queue of a zone according to a modification made to a playlist on a previously connected mobile device while the mobile device was not connected to the zone.

As mentioned previously, modifications to the playlist may be made after the mobile device has relinquished control of the playback queue, and before the mobile devices has re-entered the communicative range of the network media system. FIG. 19 shows an example flow diagram for modifying a playback queue of a zone according to a modification made to a playlist on a previously connected mobile device while the mobile device was not connected to the zone, in accordance with at least some embodiments described herein. Method 1900 shown in FIG. 19 presents an embodiment of a method that could be used in the environments 100, 600, 700, and 800 with the systems 200, 202, 204, 300, 400, and 500 for example, in communication with one or more devices, such as those illustrated in FIGS. 2-5. Method 1900 may include one or more operations, functions, or actions as illustrated by one or more of blocks 1902-1912. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 1902, method 1900 may involve establishing a connected state between a mobile device and a zone in a network media system such that an action taken on one or more media items identified in a playlist on the mobile device via the mobile device causes a corresponding action to be taken by the zone on a corresponding one or more media items in a playback queue associated with the zone. In one example, the connected state may be established according to one of the methods discussed above for establishing the connected state.

At block 1904, method 1900 may involve disconnecting the mobile device from the network media system such that the mobile device and the zone are no longer in the connected state. In one example, the mobile device may be disconnected from the network media system according to method 1300 of FIG. 13 discussed above, and in one case, disconnecting the mobile device from the network media system may involve determining that the mobile device is no longer in communication with the network media system. This may be the case when the mobile device moves out of a communicative range of the network media system. Accordingly, the mobile device may also relinquish control of the zone upon being disconnected from the network media system.

At block 1906, method 1900 may involve providing the playlist for display on a user interface of the mobile device. In one example, the interface 1000 as shown in FIG. 10A may be displayed, showing media items identified in the playlist on the mobile device. In one case, the playlist may be displayed in response to a user input indicating that the user wishes to view the playlist.

Upon viewing the playlist, the user may wish to make changes to the playlist. Accordingly, at block 1908, method 1900 may involve receiving via the mobile device, a first user input indicating a modification to the playlist on the mobile device. The modification to the playlist may involve adding or removing media items, or reordering media items identified in the playlist. In the case the interface of the mobile device is provided on a touch screen, the first user input may be provided via the touch screen. The playlist on the mobile device may then be modified accordingly and stored in response to receiving the first user input.

At block 1910, method 1900 may involve determining that the connected state between the mobile device and the zone in the network media system is to be re-established. In one example determining that the connected state between the mobile device and the zone in the network media system is to be re-established may further involve determining that communication between the mobile device and the network media system has been re-established when the mobile device is once again within communicative range of the network media system, and determining that the mobile device was previously in a connected state with the zone in the network media system.

In one case, determining that the connected state between the mobile device and the zone is to be re-established may further involve providing for display on the interface of the mobile device a prompt for a user input to indicate whether the mobile device and the zone in the network media system is to be re-established, and receiving via the mobile device, a second user input indicating that the connected state between the mobile device and the zone in the network media system is to be re-established. In this case, the prompt may be displayed upon determining that communication between the mobile device and the network media system has been re-established and that a zone in the network media system was previously in a connected state with the mobile device.

Figure 20A:
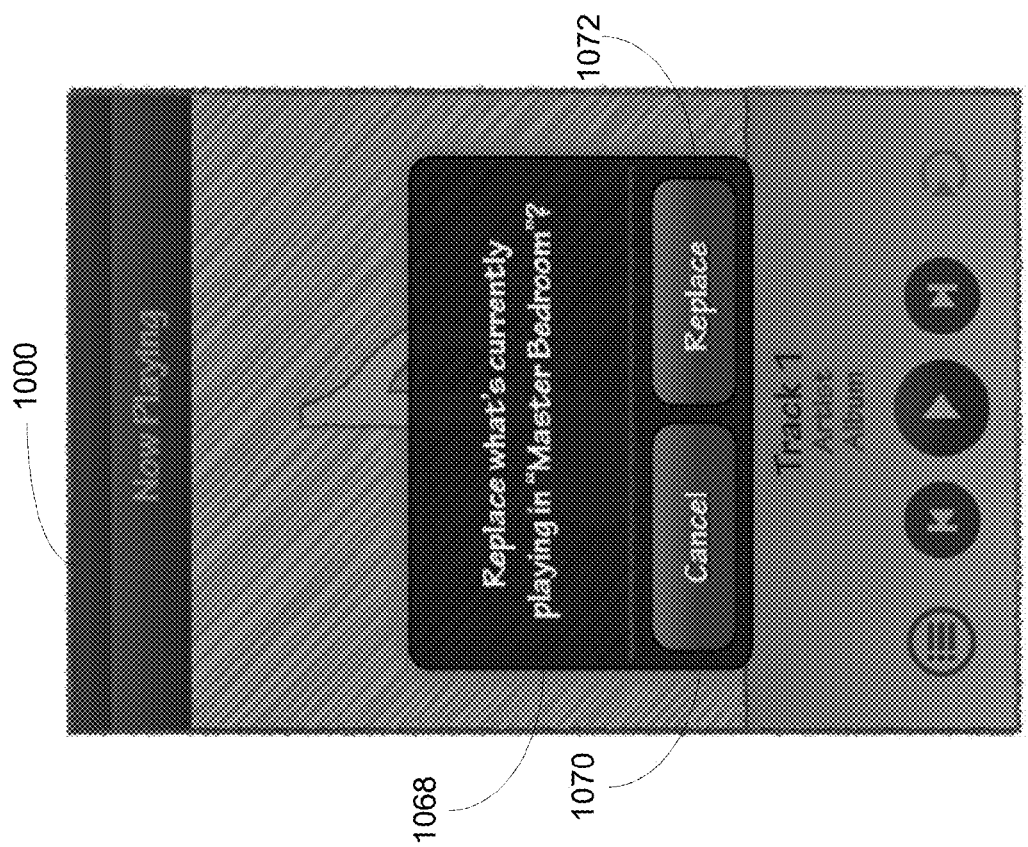
FIGS. 20A-B show a series of example user interfaces for modifying a playback queue of a zone according to a modification made to a playlist on a previously connected mobile device while the mobile device was not connected to the zone.
Figure 20B:
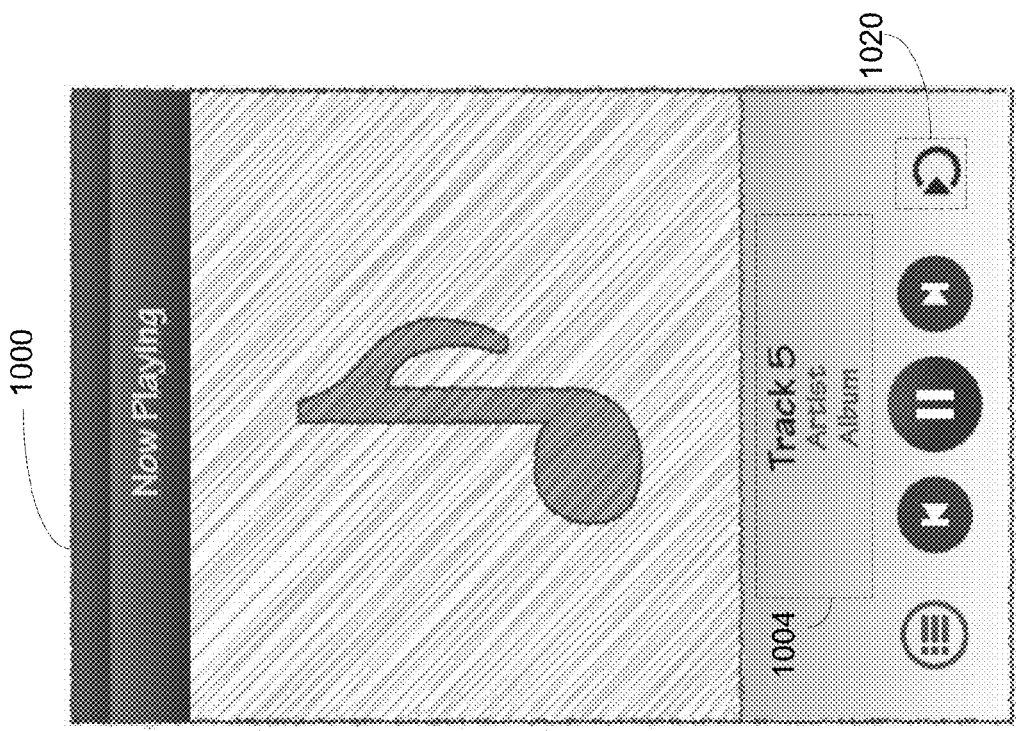

FIGS. 20A-B shows a series of example user interfaces for modifying a playback queue of a zone according to a modification made to a playlist on a previously connected mobile device while the mobile device was not connected to the zone. As shown in FIG. 20A, a confirmation prompt 1068 similar to that shown in FIG. 16C may be provided to prompt the user to indicate whether the corresponding modification to the playlist on the mobile device should be may be applied to the playback queue when re-establishing the connected state between the mobile device and the zone. As shown, the confirmation prompt 1068 may further include a cancel icon 1070 and a replace icon 1072.

In this case, if the user selects the cancel icon 1070, the corresponding modification to the playlist may not be applied to the playback queue, and in one case, the connected state between the mobile device and the zone may not be re-established. On the other hand, if the user selects the replace icon 1072, then a determination is made that the connected state between the mobile device and the zone is to be re-established. In a further embodiment, the corresponding modification to the playlist may not be applied to the playback queue, but the connected state between the mobile device and the zone may be re-established such that the mobile device displays information identifying media items in the playback queue and/or media items being played by the zone.

Responsive to determining that the connected state between the mobile device and the zone is to be re-established, block 1912 of method 1900 may involve the mobile device sending to the zone, an update message indicating the modification to the playlist on the mobile device to cause a corresponding modification to be made to the playback queue associated with the zone. In one example, sending the update message to the zone may involve sending the update message to at least one playback device of the one or more playback devices in the zone.

In one case, the update message may include a modified playlist generated from applying the modification to the playlist on the mobile device. In this case, the zone may be configured to replace media items in the playback queue associated with the zone with media items corresponding to media items identified in the modified playlist, in response to receiving the update message. The replaced media items in this case, may be media items previously added to the playback queue when the previous connected state between the mobile device and the zone was established.

In another case, the update message may identify one or more updates associated with at least one of the one or more media items identified in the playlist. In this case, the zone may be configured to apply the one or more updates to the corresponding at least one of one or more media items in the playback queue associated with the zone, in response to receiving the update message.

In one example, as previously mentioned, the zone may continue to play corresponding media items in the playback queue after the mobile device is no longer in communication with the network media system and has relinquished control of the zone. As such, the zone may be playing a corresponding media item in the playback queue when the determination is made that the connected state is to be re-established between the zone and the mobile device.

In one case, the modifications in the update message received by the zone may involve the corresponding media item being played by the zone when the determination is made that the connected state is to be re-established between the zone and the mobile device. In this case, playback of the corresponding media item may be stopped so that the modifications may be applied.

In another case, the modifications in the update message received by the zone may not involve the corresponding media item being played by the zone when the determination is made that the connected state is to be re-established between the zone and the mobile device. In this case, the corresponding media item may continue to be played by the zone while the modifications indicated in the update message may be applied to one or more other corresponding media items in the playback queue.

In a further case, the modifications in the update message may involve reordering the corresponding media items in the playback queue, including the particular corresponding media item being played by the zone when the determination is made that the connected state is to be re-established between the zone and the mobile device. In such a case, the particular corresponding media item may continue to play while the reordering of the playback queue is applied.

For example, the particular corresponding media item may be at an original playback position in the playback queue. For purposes of illustration, the first playback position may be a fifth position such that four media items are in front of the particular corresponding media item in the playback queue, and an additional three media items, for example are after the particular corresponding media item in the playback queue. In one case, the modifications may involve reordering the media items in the playback queue such that the playback position of the particular corresponding media item in the playback queue is changed to a new playback position. For purposes of illustration, the new playback position may be the second position in the modified playback queue, such that only one media item is in front of the particular corresponding media item in the modified playback queue, and six media items are after the particular media item in the modified playback queue.

In this case, the particular corresponding media item may continue to be played by the zone while the playback queue is modified, such that the playback position of the particular corresponding media item is updated to be in the new position of the now updated playback queue, rather than the original fifth position, without stopping playback of the particular corresponding media item. In other words, the reordering of media items in the playback queue may be modified "around" the particular corresponding media item that is being played in a substantially seamless manner.

Upon re-establishing the connected state between the mobile device and the zone, and accordingly applying modification made to the playlist to the playback queue associated with the zone, the interface 1000 as shown in FIG. 20B may be provided by the mobile device indicating that Track 5, as identified by the data information 1004 is being played. In one case, Track 5 may be the particular corresponding media item being played by the zone when the connected state was re-established. Also shown in FIG. 20B is the connected state indicator 1020 indicating that mobile device is now in a connected state Other example methods, interactions and interfaces may also be possible.

XII. Example Moving of a Playback Queue to a New Zone

Figure 21:
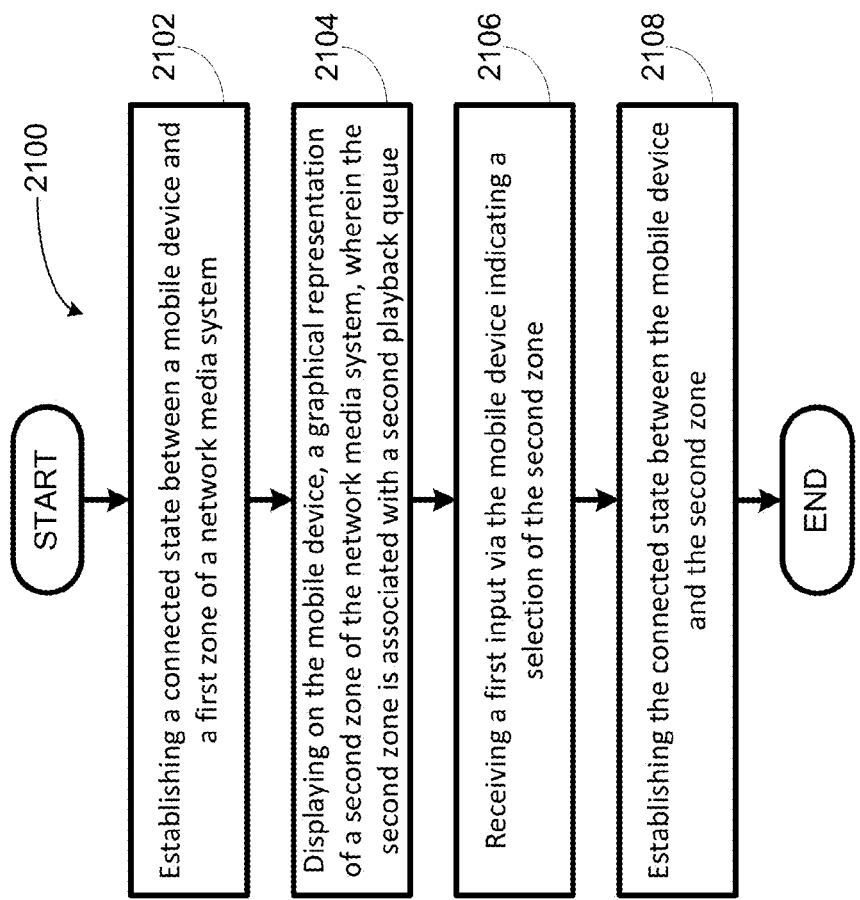
FIG. 21 shows an example flow diagram for moving a playback queue to a different zone.

As mentioned previously, embodiments described herein may further involve establishing the connected state with a second zone in the network media system and playing to the second zone. FIG. 21 shows an example flow diagram for moving a playback queue to a new zone, in accordance with at least some embodiments described herein. Method 2100 shown in FIG. 21 presents an embodiment of a method that could be used in the environments 100, 600, 700, and 800 with the systems 200, 202, 204, 300, 400, and 500 for example, in communication with one or more devices, such as those illustrated in FIGS. 2-5. Method 2100 may include one or more operations, functions, or actions as illustrated by one or more of blocks 2102-2108. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 2102, method 2100 may involve establishing a connected state between a mobile device and a first zone of one or more playback devices in a network media system. In one example, the connected state may be established according to methods discussed above, such as method 900 shown in FIG. 9. Accordingly, the connected state between the mobile device and the first zone may be established such that an action taken on a playlist identifying one or more media items via the mobile device causes a corresponding action to be taken on a first playback queue associated with the first zone. As also previously discussed, the first playback queue includes one or more media items corresponding to the one or more media items identified in the playlist. In the case of method 900, the first zone may be the "Master Bedroom" zone.

Figure 22B:
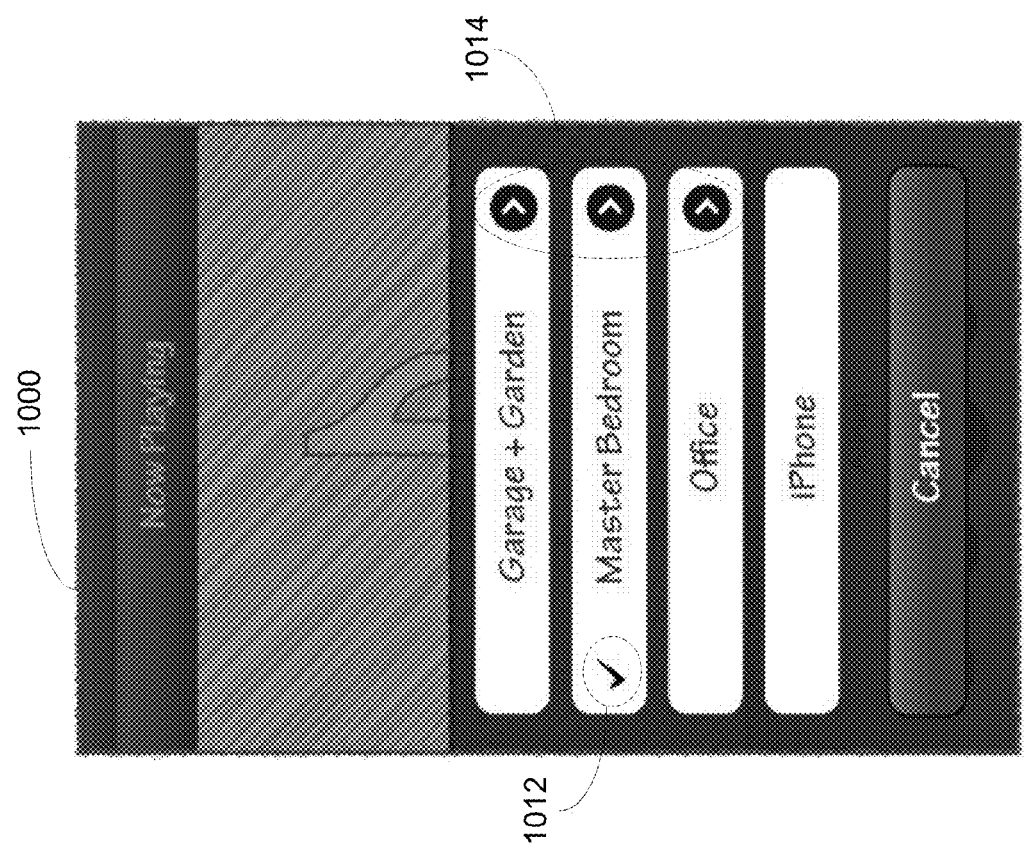
FIGS. 22A-E show a series of example user interfaces for moving a playback queue to a different zone.
Figure 22A:
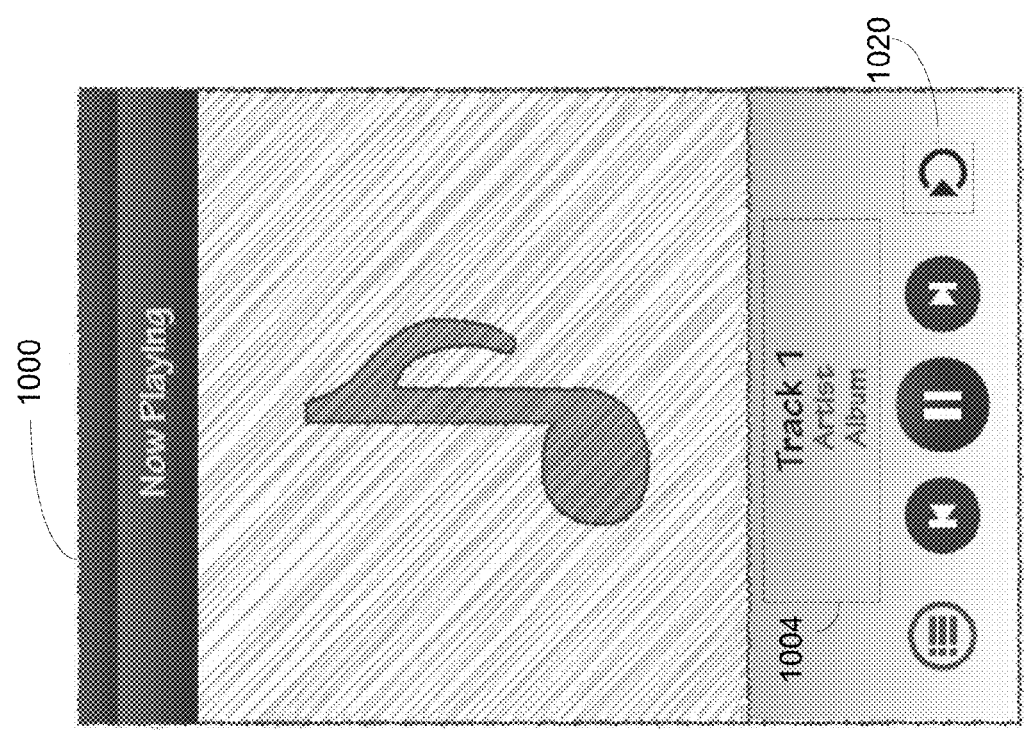

FIGS. 22A-E shows a series of example user interfaces for moving a playback queue to a new zone. FIG. 22A shows the interface 1000 after a connected state has been established between the mobile device and the first zone, and is playing Track 1, as indicated by the data information 1004. Similar to that shown in FIG. 12, the interface 1000 also displays a connected state icon 1020 indicating that the mobile device is now in a connected state with the first zone.

At block 2104, method 2100 may involve displaying on the mobile device, a graphical representation of a second zone of one or more playback devices in the network media system. Similar to the first zone, the second zone may be associated with a second playback queue. FIG. 22B shows the interface 1000 displaying zone representations identifying zones in the network media system, including the "Garage+Garden" zone, the "Master Bedroom" zone, and the "Office" zone, as well as the graphical representation of the "iPhone" mobile device, similar to that shown in FIG. 10C. In this case, the icon 1012 may overlay the graphical representation of the "Master Bedroom" zone to indicate that the first playback queue associated with the first zone, which in this case is the "Master Bedroom" zone, is active. Also shown in FIG. 22B are graphical icons 1014 similar to that shown previously in FIG. 10C.

At block 2106, method 2100 may involve receiving a first input via the mobile device indicating a selection of the second zone. In one example, the user may provide an input, such as a touch input on the interface 1000 shown in FIG. 22B indicating a selection of the "Office" zone. In this case, the input may involve the user touching or tapping the graphical representation of the "Office" zone. Responsive to the first input selecting the "Office" zone, block 2108 of method 2100 may involve establishing the connected state between the mobile device and the second zone such that an action taken on the playlist via the mobile device causes a corresponding action to be taken on both the first and second playback queues.

In this case, however, the mobile device may already be in a connected state with the "Master Bedroom" zone. Accordingly, the interface 1000 may display the confirmation prompt 1062 similar to that shown previously in FIG. 18C. In this case, the confirmation prompt 1062 may be displayed with the connect icon 1064 and the replace icon 1066 to prompt the user to indicate whether the mobile device should connect to the "Office" zone, or replace what is playing in the "Office" zone, respectively. In some embodiments, the replace icon 1066 may prompt the user to indicate whether the mobile device should connect to the "Office" zone, or move what is currently playing in the "Master Bedroom" zone to the "Office" zone.

If the user selects the replace icon 1066 to replace (or move) what is currently playing in the "Office" zone, the connected state between the mobile device and the "Office" zone may be established similar to that described above in connection to method 900 where the active playlist on the mobile device may be applied or extended to the "Office" zone. As such, a playback queue associated with the "Office" zone may be populated with media items corresponding to media items identified in the active playlist. In the case the mobile device was playing a media item in the active playlist in synchrony with the "Master Bedroom" zone, a media item in the playback queue associated with the "Office" zone corresponding to the media item in the active playlist may then be played by the "Office" zone in synchrony with the playback of the media item by the mobile device. Note that in this case, the playback queue associated with the first zone, which in this example may be the "Master Bedroom" zone, is already populated with media items corresponding to media items identified in the playlist on the mobile device. As such, the second zone, which in this example may be the "Office" zone, may receive information identifying the corresponding media items from either the mobile device, one or more playback devices in the first zone, or both.

In one example, the selection of the replace icon 1066 may not create a zone group for the "Office" zone and the "Master Bedroom" zone such that the "Office" zone and "Master Bedroom" zone both play corresponding media items from their respective playback queues in synchrony with the mobile device. Rather, the connected state between the mobile device and the "Master Bedroom" zone may be transferred (replaced or moved) to become a connected state between the mobile device and the "Office" zone. In other words, the mobile device may effectively relinquish control of the "Master Bedroom" zone. Accordingly, the "Master Bedroom" zone may, in one case, continue to playback corresponding media items in the playback queue associated with the "Master Bedroom" zone, as previously discussed in connection to method 1300 of FIG. 13. In another case, the "Master Bedroom" zone may stop playing the corresponding media items in the playback queue.

As part of transferring the connected state, playback of the corresponding media items by the first and second zones ("Master Bedroom" zone and "Office" zone, respectively in this example) may also be effectively transferred. In one example the "Office" zone may begin playing the corresponding media items in synchrony with the "Master Bedroom" zone and the mobile device in response to establishing the connected state between the mobile device and the "Office" zone. In one case, playback of the corresponding media item by the "Office" zone may begin by fading in. Once the "Office" zone is playing the corresponding media item in synchrony with the "Master Bedroom" zone and the mobile device, playback of the corresponding media item by the "Master Bedroom" zone may stop. In one case, the playback of the corresponding media item by the "Master Bedroom" zone may stop by fading out. As such, the connected state as well as the playback of the corresponding media items may be transferred in a substantially seamless manner.

Figure 22D:
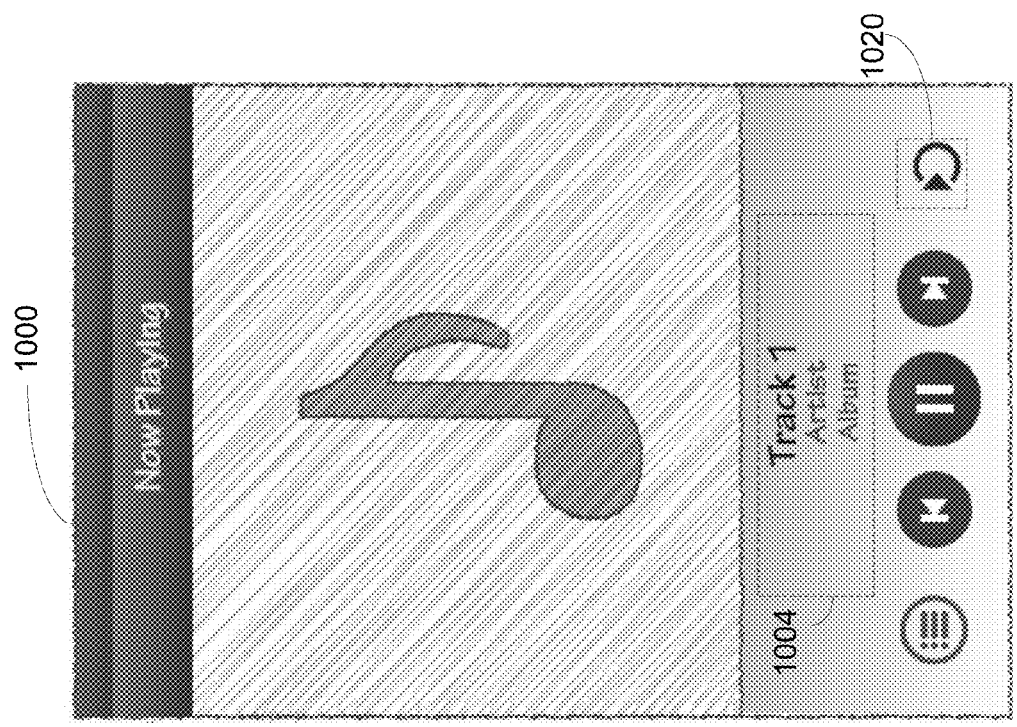
Figure 22C:
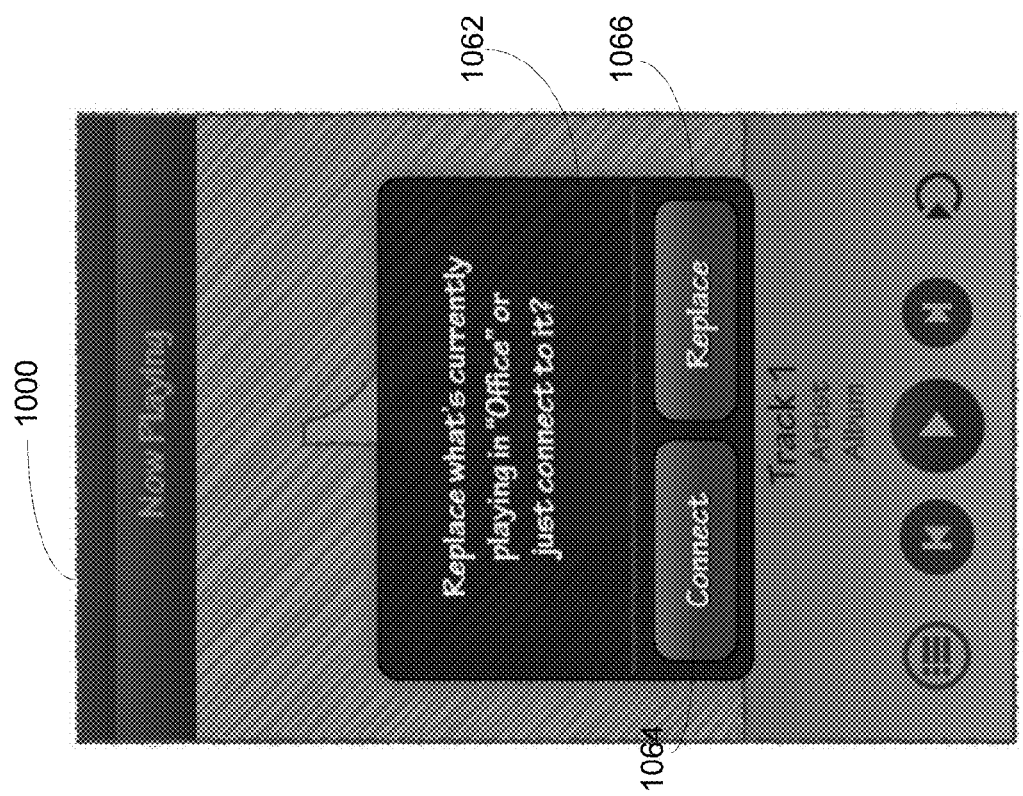

FIG. 22D shows the interface 1000 after a connected state has been established between the mobile device and the "Office" zone in response to the selection of the replace icon 1066. As shown, the mobile device may be playing Track 1 as indicated by the data information 1004, and may be in a connected state, as indicated by the connected state indicator 1020.

Referring back to FIG. 22C, if the user instead selects the connect icon 1064 to connect to the "Office" zone, a connected state between the mobile device and the "Office" zone may be established similar to that described above in connection to method 1500 such that the playlist on the mobile device may be populated with media items corresponding to media items identified in a playback queue associated with the "Office" zone. As in the case discussed above, the playback queue associated with the first zone may already be populated with media items corresponding to media items identified in the playlist on the mobile device.

Accordingly, the second zone may receive information identifying the corresponding media items from either the mobile device, one or more playback devices in the first zone, or both.

In this case, the connected state between the mobile device and the "Master Bedroom" zone may not be transferred to become the connected state between the mobile device and the "Office" zone. In other words, the connected state established between the mobile device and the "Office" zone may be effectively a new connected state, albeit with the same active playlist on the mobile device and the same corresponding media items as in the connected state between the mobile device and the "Master Bedroom" zone. In one example, playback of corresponding media items by the "Office" zone may be stopped in response to establishing the connected state between the mobile device and the "Office" zone when the connect icon 1064 is selected. In one case, playback of media items on the mobile device, if present, may also be stopped.

In another case, because the playback queue associated with the "Office" zone may be a private queue already populated with the media items corresponding to media items identified in the active playlist, establishing the connected state between the mobile device and the "Office" zone in response to the selection of the connect icon may not involve re-populating the playback queue, but rather re-acquiring control access of the private queue by the mobile device, such that an action taken on media items identified in the active playlist on the mobile device via the mobile device causes a corresponding action to be taken on corresponding media items in the private queue. In one instance, establishing the connected state by re-acquiring control of the private queue may be referred to as establishing a control state.

Figure 22E:
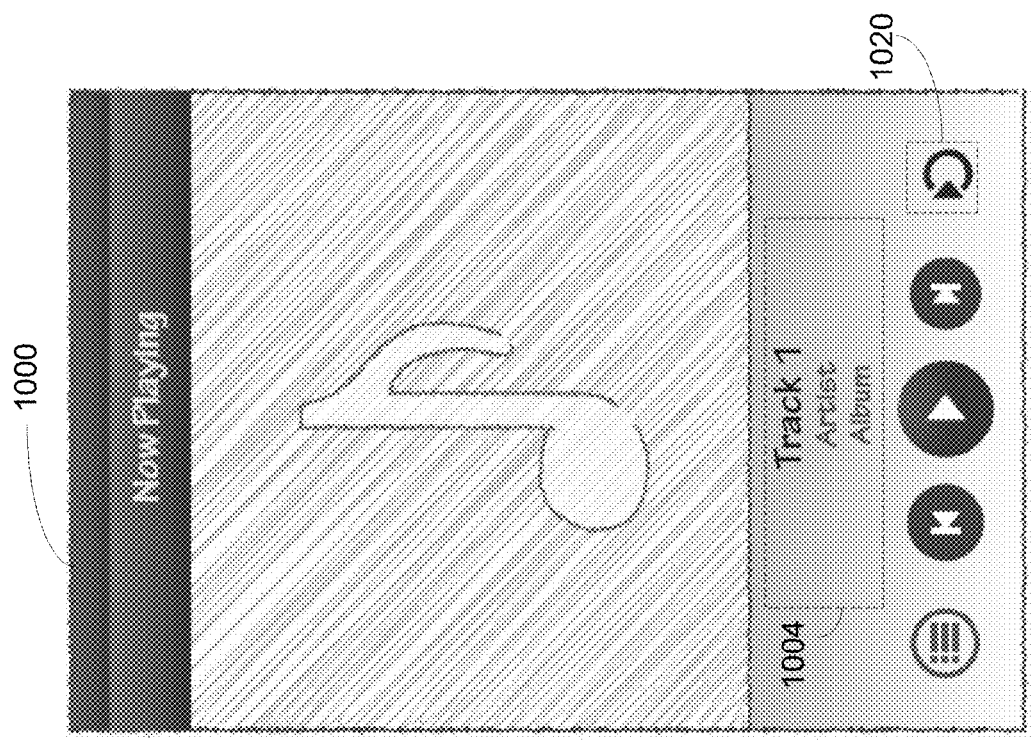

FIG. 22E shows the interface 1000 after a connected state has been established between the mobile device and the "Office" zone in response to the selection of the connect icon 1064. In one case, neither the mobile device nor the "Office" zone may be playing a media item. However, a media item from the newly populated playback queue or previously populated private queue, such as Track 1, as shown, may be provided as a first media item in the playback queue associated with the "Office" zone, awaiting a corresponding action. Also shown in the interface 1000 of FIG. 22E is that the mobile device may be in a connected state, as indicated by the connected state indicator 1020.

In a further case when the connect icon 1064 is selected, the playback queue associated with the "Office" zone may not be immediately replaced and/or populated with media items corresponding to the media items identified in the playlist on the mobile device. In this case, the "Office" zone may continue to play media items the "Office" zone may have been playing prior to being selected for the connected state with the mobile device until an action is taken on one or more media items identified in the playlist on the mobile device. At this point, playback of any previous media items by the "Office" zone may be stopped, the playback queue associated with the "Office" zone may be populated with media items corresponding to media items identified in the playlist, and an action corresponding to the action taken on the one or more media items in the playlist on the mobile device may be taken one or more of the corresponding media items in the playback queue.

Other example methods, interactions and interfaces may also be possible.

XIII. Example Private Queue Indicator

As mentioned previously, the network media system may also be accessed by a second mobile device. In one instance, the playlist on the mobile device may be private and inaccessible to the second mobile device. Accordingly, the playback queue associated with the zone the mobile device is playing to may also be private to the second mobile device. In this instance, an interface of the second mobile device may provide a private queue indicator to indicate that the zone may be associated with a private queue.

Figure 23:
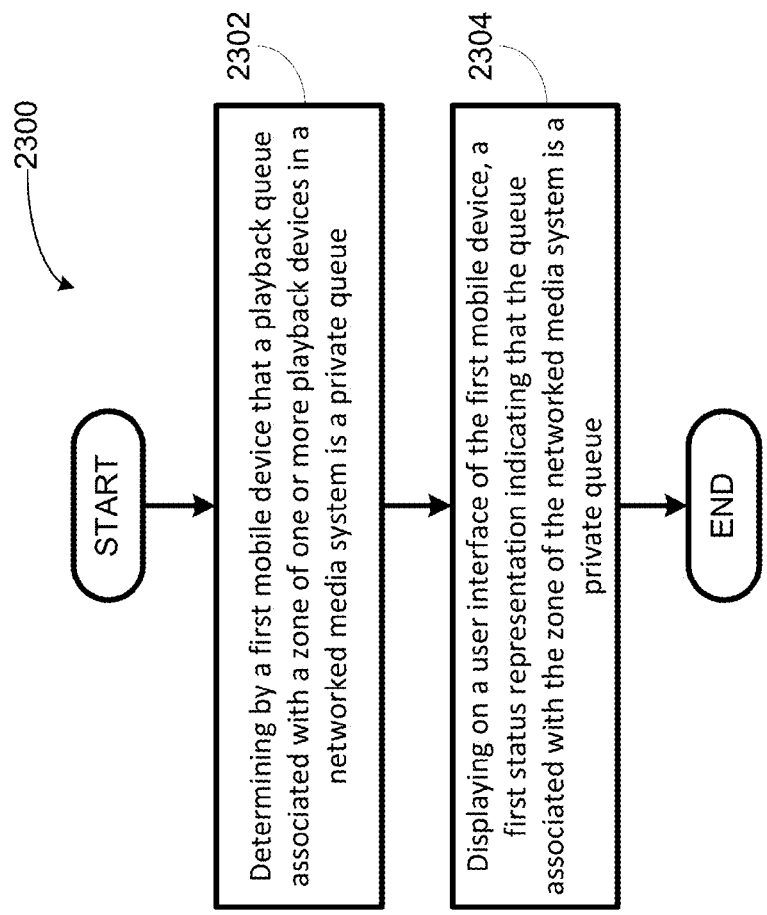
FIG. 23 shows an example flow diagram for providing a private queue indicator.

FIG. 23 shows an example flow diagram providing a private queue indicator, in accordance with at least some embodiments described herein. Method 2300 shown in FIG. 23 presents an embodiment of a method that could be used in the environments 100, 600, 700, and 800 with the systems 200, 202, 204, 300, 400, and 500 for example, in communication with one or more devices, such as those illustrated in FIGS. 2-5. Method 2300 may include one or more operations, functions, or actions as illustrated by one or more of blocks 2302-2304. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 2302, method 2300 may involve determining by a first mobile device that a playback queue associated with a zone of one or more playback devices in a networked media system is a private queue. As discussed previously, the private queue may be a playback queue containing content only accessible to users and/or mobile devices with access rights to the playback queue. For instance, the private queue may include one or more media items from a second playlist on a second mobile device. Further, a credential may be required to access private queue information identifying the one or more media items in the private queue.

In one case, the private queue may be generated when a playback queue associated with a zone is populated with media items corresponding to media items identified in a playlist on a mobile device. As such, a private queue associated with a zone may be generated when a connected state is generated between the zone and the mobile device.

At block 2304, method 2300 may involve displaying on a user interface of the first mobile device, a first status representation indicating that the queue associated with the zone of the networked media system is a private queue such that the credential may required to access the private queue information.

Figure 24B:
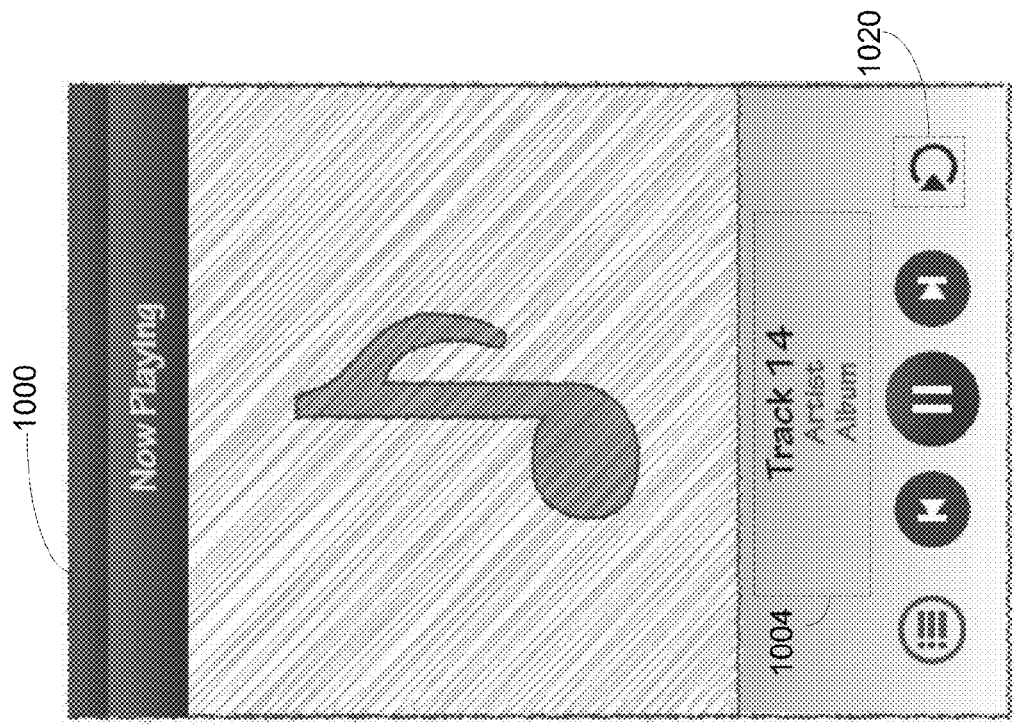
FIGS. 24A-D show a series of example user interfaces providing a private queue indicator.
Figure 24A:
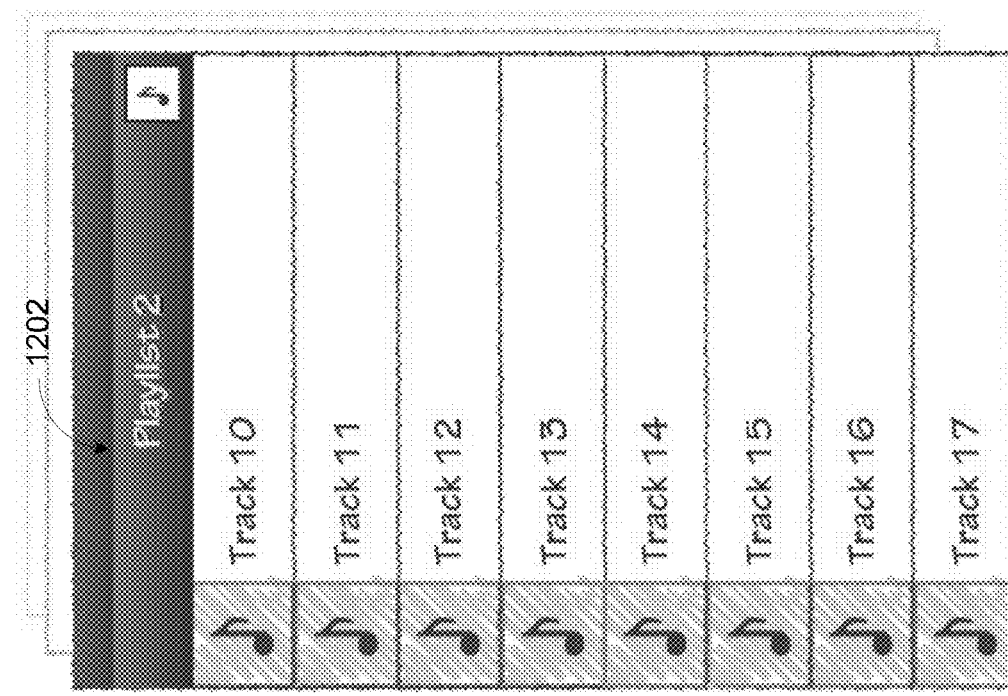

FIGS. 24A-D show a series of example user interfaces for providing a private queue indicator. FIG. 24A shows an example playlist 1202 that may be provided on an interface of the mobile device. In this example, the mobile device may already be in a connected state with the "Office" zone as discussed in the previous section in connection with method 2100 and FIGS. 22A-22E. As shown, the playlist 1202 may include media items Track 10 to Track 17. In one example, the user using the mobile device may select Track 14, and upon receiving the selection of Track 14, the mobile device may be configured to begin playing Track 14.

During playback of Track 14, the interface 1000 of the mobile device may provide "Now Playing" information and playback control options, as shown in FIG. 24B. The "Now Playing" information may include data information 1004 identifying Track 14. In this case, as mentioned previously, the mobile device may be in a connected state with the "Office" zone, and accordingly, the connected state indicator 1020 may be displayed on the interface 1000. As suggested previously, the connected state indicator 1020 may also function as a play-to icon. Accordingly, the user may select the connected state indicator 1020 if the user wishes to extend actions taken on the one or more media items identified in the playlist 1202 to one or more zones in a network media system.

Figure 24D:
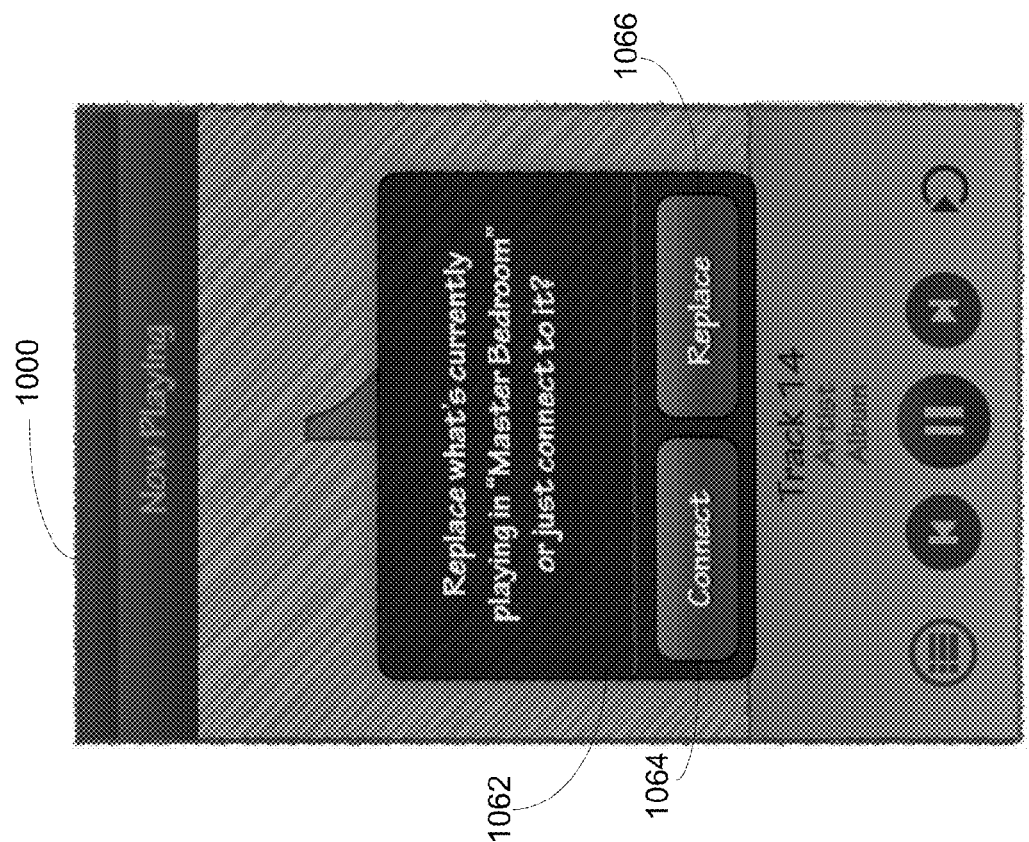
Figure 24C:
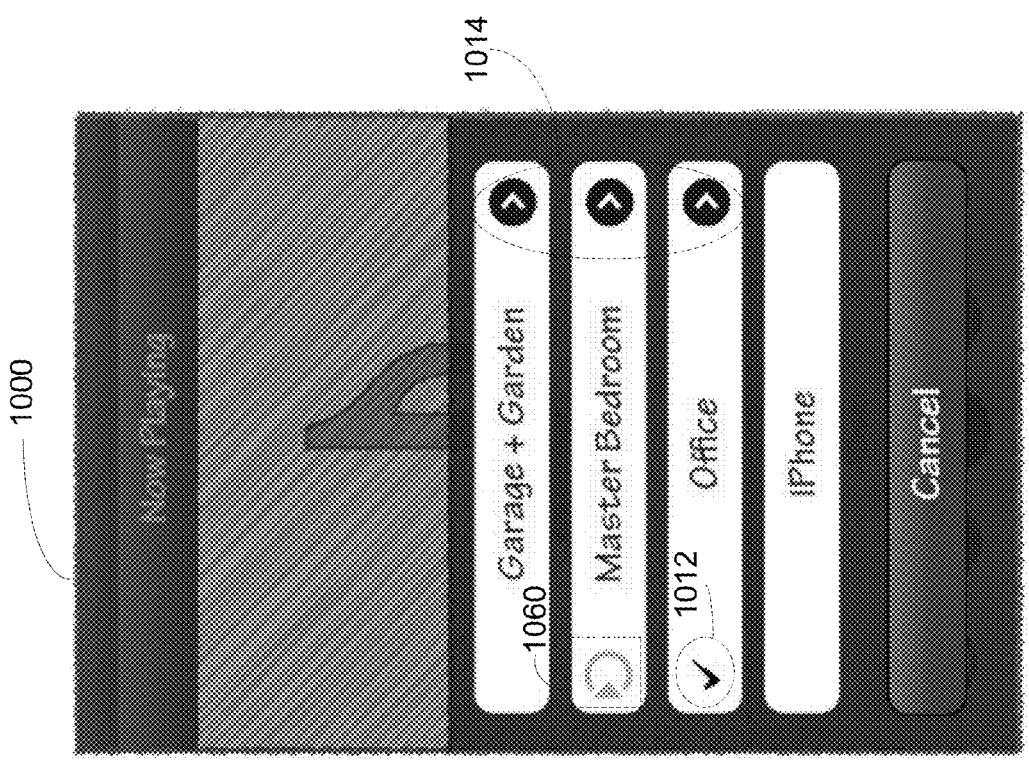

Upon receiving the selection of the connected state indictor 1020, the interface 1000 may display zone representations of zones in the network media system, as shown in FIG. 24C. In this example, zones in the network media system may include the "Garage+Garden" zone, the "Master Bedroom" zone, and the "Office" zone. Also shown in FIG. 24C, the icon 1012 overlaying the graphical representation of the "Office" zone may be displayed on the interface to indicate that the playback queue associated with the "Office" zone may be currently active, and graphical icons 1014 overlaying the zone representations may indicate that one or more of the zones are available for the currently active playlist to be extended to. In this case, a private queue icon 1060 may overlay the graphical representation of the "Master Bedroom" zone, because as discussed, the "Master Bedroom" zone may have previously been in a connected state with the mobile device and as a result may be associated with a private playback queue populated with media items corresponding to media items identified in the previously active playlist 1002 shown in FIG. 10A. As shown, the private queue icon 1060 may be graphically similar to that of the play-to 1010 icon or connected state icon 1020.

In one case, the user may select the graphical representation of the "Master Bedroom" zone, which may be associated with a private queue as indicated by the private queue icon 1060 overlaying the graphical representation of the "Master Bedroom" zone. In this case, because the mobile device was previously in the connected state with the "Master Bedroom" zone, the confirmation prompt 1062 with the connect icon 1064 and replace icon 1066 may be displayed by the interface 1000 as shown in FIG. 24D to prompt the user to indicate whether the mobile device should connect to the "Master Bedroom" zone, or replace (or transfer) what is playing in the "Master Bedroom" zone, as previously discussed in connection to FIGS. 18C and 22C.

If the user selects the replace icon 1066, a connected state may be established between the mobile device and the "Master Bedroom" zone as previously discussed in connection to FIG. 22D, such that the private queue associated with the "Master Bedroom" zone may become populated with media items corresponding to media items identified in the active playlist 1202. Accordingly, an action taken on one or more media items identified in the active playlist 1202 via the mobile device may cause a corresponding action to be taken by the "Master Bedroom" zone on a corresponding one or more media items in the private queue associated with the "Master Bedroom" zone. Analogously, if the user selects the connect icon 1064, a connected state (or control state) may be established between the mobile device and the "Master Bedroom" zone as previously discussed in connection to FIGS. 22B and 22E.

Note that in this example, the mobile device that was previously in the connected state with the "Master Bedroom" zone may be the same mobile device that is accessing the playlist 1202 and that may be in a connected state with the "Office" zone. As such, the mobile device may automatically have access to the private queue associated with the "Master Bedroom" zone, thereby allowing the mobile device to establish the connected state with the "Master Bedroom" zone.

However, referring back to method 2300, a similar sequence of the interface shown in FIGS. 24A-D may also be displayed by the mobile device if the mobile device is a different mobile device than the mobile device that was previously in the connected state with the "Master Bedroom" zone. In this case, the mobile device may be required to provide a credential to access the private queue associated with the "Master Bedroom" zone between when the "Master Bedroom" zone is selected on the interface 1000 as shown in FIG. 24C, and when the user is prompted to indicate on the interface 1000 how the connected state is to be established, as shown in FIG. 24D. In one example, providing the credential may involve prompting the user of the mobile device to enter a password. In another example, the credential may involve an identifier of the user of the mobile device, or an identifier of the mobile device itself.

Other example configurations and embodiments may also be possible.

XIV. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves embodiments for modifying a playlist. In one aspect, a method is provided. The method involves establishing a connected state between a mobile device and a zone of one or more playback devices in a network media system. The connected state of the mobile device with the zone indicates that an action taken on one or more media items identified in a playlist on the mobile device via the mobile device causes a corresponding action to be taken by the zone on a corresponding one or more media items in a playback queue associated with the zone. The method further involves disconnecting the mobile device from the network media system such that the mobile device and the zone are no longer in the connected state, providing the playlist for display on an user interface of the mobile device, receiving via the mobile device, a first user input indicating a modification to the playlist on the mobile device, determining that the connected state between the mobile device and the zone in the network media system is to be re-established, and responsively, sending to the zone, an update message indicating the modification to the playlist on the mobile device to cause a corresponding modification to be made to the playback queue associated with the zone.

In another aspect, a non-transitory computer readable memory is provided. The non-transitory computer readable memory has stored thereon instructions executable by a computing device to cause the computing device to perform functions. The functions include establishing a connected state between a mobile device and a zone of one or more playback devices in a network media system. The connected state of the mobile device with the zone indicates that an action taken on one or more media items identified in a playlist on the mobile device via the mobile device causes a corresponding action to be taken by the zone on a corresponding one or more media items in a playback queue associated with the zone. The functions further include disconnecting the mobile device from the network media system such that the mobile device and the zone are no longer in the connected state, providing the playlist for display on an user interface of the mobile device, receiving via the mobile device, a first user input indicating a modification to the playlist on the mobile device, determining that the connected state between the mobile device and the zone in the network media system is to be re-established, and responsively, sending to the zone, an update message indicating the modification to the playlist on the mobile device to cause a corresponding modification to be made to the playback queue associated with the zone.

In yet another aspect, a device is provided. The device includes a processor and memory having stored thereon instructions executable by the processor to perform functions. The functions include establishing a connected state between a mobile device and a zone of one or more playback devices in a network media system. The connected state of the mobile device with the zone indicates that an action taken on one or more media items identified in a playlist on the mobile device via the mobile device causes a corresponding action to be taken by the zone on a corresponding one or more media items in a playback queue associated with the zone. The functions further include disconnecting the mobile device from the network media system such that the mobile device and the zone are no longer in the connected state, providing the playlist for display on an user interface of the mobile device, receiving via the mobile device, a first user input indicating a modification to the playlist on the mobile device, determining that the connected state between the mobile device and the zone in the network media system is to be re-established, and responsively, sending to the zone, an update message indicating the modification to the playlist on the mobile device to cause a corresponding modification to be made to the playback queue associated with the zone.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method comprising:
    establishing, via a local network, a connected state between a mobile device and a zone of one or more playback devices in a network media system such that an action taken, via the mobile device, on one or more media items identified in a playlist of a streaming content provider causes a corresponding action to be taken by the zone on one or more corresponding media items in a playback queue associated with the zone and stored on a given playback device of the zone;
    disconnecting the mobile device from the network media system such that the mobile device and the zone are no longer in the connected state via the local network;
    providing the playlist of the streaming content provider for display on a user interface of the mobile device, wherein the playlist of the streaming content provider identifies media items for playback on the mobile device;
    while the mobile device is disconnected from the network media system, receiving via the mobile device, a first user input indicating a modification to the playlist of the streaming content provider on the mobile device;
    determining that the connected state between the mobile device and the zone in the network media system is to be re-established via the local network; and
    responsive to re-establishing the connected state between the mobile device and the zone, sending to the given playback device of the zone, an update message indicating the modification to the playlist of the streaming content provider to automatically cause a corresponding modification to be made to the playback queue associated with the zone.

2. The method of claim 1, wherein disconnecting the mobile device from the network media system further comprises:
    determining that the mobile device is no longer in communication with the network media system via the local network.

3. The method of claim 1, wherein determining that the connected state between the mobile device and the zone in the network media system is to be re-established further comprises:
    determining that the mobile device has re-established communication with the network media system via the local network.

4. The method of claim 1, wherein determining that the connected state between the mobile device and the zone in the network media system is to be re-established further comprises:
    providing for display on the user interface of the mobile device a prompt for a user input to indicate whether the mobile device and the zone in the network media system is to be re-established; and
    receiving via the mobile device, a second user input indicating that the connected state between the mobile device and the zone in the network media system is to be re-established.

5. The method of claim 1, wherein sending the update message comprises:
    sending the update message to at least the given playback device of the one or more playback devices in the zone.

6. The method of claim 1, wherein the update message includes a modified playlist generated from applying the modification to the playlist of the streaming content provider, the method further comprising:
  causing the one or more corresponding media items in the playback queue to be replaced by one or more media items identified by the modified playlist.

7. The method of claim 1, wherein the update message identifies one or more updates each associated with at least one of the one or more media items identified in the playlist, the method further comprising:
  causing the one or more updates to be applied to at least one of the one or more corresponding media items in the playback queue associated with the zone.

8. The method of claim 1, wherein a particular corresponding media item in the one or more corresponding media items in the playback queue is being played by the one or more playback devices in the zone, the method further comprising:
  determining that the corresponding modification to be made to the playback queue associated with the zone does not involve the particular corresponding media item; and
  causing the particular corresponding media item to continue to be played by the one or more playback devices.

9. The method of claim 1, wherein a particular corresponding media item in the one or more corresponding media items in the playback queue is being played by the one or more playback devices in the zone, the method further comprising:
  determining that the corresponding modification to be made to the playback queue associated with the zone involves the particular corresponding media item; and
  causing the playback of the particular corresponding media item to be stopped.

10. The method of claim 1, wherein a particular corresponding media item in the one or more corresponding media items in the playback queue is being played by the one or more playback devices in the zone at a certain playback position in the playback queue, and wherein the corresponding modification to be made to the playback queue involves reordering the one or more corresponding media items in the playback queue according to a new track order, the method further comprising:
  while the particular corresponding media item continues to be played by the one or more playback devices in the zone, applying the corresponding modification to the playback queue such that the playback position of the particular corresponding media item is updated to a new playback position according to the new track order; and
  causing the particular corresponding media item to continue to be played at the new playback position.

11. The method of claim 1, wherein the corresponding action taken on the one or more corresponding in the playback queue of the zone comprises one or more of the following: (a) playing the one or more corresponding media items, (b) pausing playback of the one or more corresponding media items, (c) muting playback of the one or more corresponding media items, (d) removing the one or more corresponding media items from the playback queue, (e) adding a new media item to the one or more corresponding media items in the playback queue, and (f) playing a next media item in the one or more corresponding media items in the playback queue.

12. A device comprising:
a processor;
and memory having stored thereon instructions executable by the processor to cause the device to perform functions comprising:
establishing, via a local network, a connected state between a mobile device and a zone of one or more playback devices in a network media system such that an action taken, via the mobile device, on one or more media items identified in a playlist of a streaming content provider causes a corresponding action to be taken by the zone on one or more corresponding media items in a playback queue associated with the zone and stored on a given playback device of the zone;
disconnecting the mobile device from the network media system such that the mobile device and the zone are no longer in the connected state via the local network;
providing the playlist of the streaming content provider for display on a user interface of the mobile device, wherein the playlist of the streaming content provider identifies media items for playback on the mobile device;
while the mobile device is disconnected from the network media system, receiving via the mobile device, a first user input indicating a modification to the playlist of the streaming content provider on the mobile device;
determining that the connected state between the mobile device and the zone in the network media system is to be re-established via the local network; and
responsive to re-establishing the connected state between the mobile device and the zone, sending to the given playback device of the zone, an update message indicating the modification to the playlist of the streaming content provider to automatically cause a corresponding modification to be made to the playback queue associated with the zone.

13. The device of claim 12, wherein the function of determining that the connected state between the mobile device and the zone in the network media system is to be re-established further comprises:
  providing for display on the user interface of the mobile device a prompt for a user input to indicate whether the mobile device and the zone in the network media system is to be re-established; and
  receiving via the mobile device, a second user input indicating that the connected state between the mobile device and the zone in the network media system is to be re-established.

14. The device of claim 12, wherein the function of sending the update message comprises:
  sending the update message to at least the given playback device of the one or more playback devices in the zone.

15. The device of claim 12, wherein the update message includes a modified playlist generated from applying the modification to the playlist of the streaming content provider, and wherein the functions further comprise:
  causing the one or more corresponding media items in the playback queue to be replaced by one or more media items identified by the modified playlist.

16. The device of claim 12, wherein the update message identifies one or more updates each associated with at least one of the one or more media items identified in the playlist, and wherein the functions further comprise:
  causing the one or more updates to be applied to at least one of the one or more corresponding media items in the playback queue associated with the zone.

17. A non-transitory computer readable medium having stored thereon instructions executable by a computing device to cause the computing device to perform functions comprising:

establishing, via a local network, a connected state between a mobile device and a zone of one or more playback devices in a network media system such that an action taken, via the mobile device, on one or more media items identified in a playlist of a streaming content provider causes a corresponding action to be taken by the zone on one or more corresponding media items in a playback queue associated with the zone and stored on a given playback device of the zone;

disconnecting the mobile device from the network media system such that the mobile device and the zone are no longer in the connected state via the local network;

providing the particular playlist of the streaming content provider for display on an user interface of the mobile device, wherein the playlist of the streaming content provider identifies media items for playback on the mobile device;

while the mobile device is disconnected from the network media system, receiving via the mobile device, a first user input indicating a modification to the playlist of the streaming content provider on the mobile device;

determining that the connected state between the mobile device and the zone in the network media system is to be re-established via the local network; and responsive to re-establishing the connected state between the mobile device and the zone, sending to the given playback device of the zone, an update message indicating the modification to the playlist of the streaming content provider to automatically cause a corresponding modification to be made to the playback queue associated with the zone.

18. The non-transitory computer readable medium of claim 17, wherein a particular corresponding media item in the one or more corresponding media items in the playback queue is being played by the one or more playback devices in the zone, and wherein the functions further comprise:

determining that the corresponding modification to be made to the playback queue associated with the zone does not involve the particular corresponding media item; and causing the particular corresponding media item to continue to be played by the one or more playback devices.

19. The non-transitory computer readable medium of claim 17, wherein a particular corresponding media item in the one or more corresponding media items in the playback queue is being played by the one or more playback devices in the zone, and wherein the functions further comprise:

determining that the corresponding modification to be made to the playback queue associated with the zone involves the particular corresponding media item; and causing the playback of the particular corresponding media item to be stopped.

20. The non-transitory computer readable medium of claim 17, wherein a particular corresponding media item in the one or more corresponding media items in the playback queue is being played by the one or more playback devices in the zone at a playback position in the playback queue, and wherein the corresponding modification to be made to the playback queue involves reordering the one or more corresponding media items in the playback queue according to a new track order, and wherein the functions further comprise:

while the particular corresponding media item continues to be played by the one or more playback devices in the zone, applying the corresponding modification to the playback queue such that the playback position of the particular corresponding media item is updated to a new playback position according to the new track order; and causing the particular corresponding media item to continue to be played at the new playback position.

21. The method of claim 1, wherein the playlist of a streaming content provider comprises a user-generated playlist of media items playable from the streaming content provider.

22. The device of claim 12, wherein the playlist of a streaming content provider comprises a user-generated playlist of media items playable from the streaming content provider.

23. The non-transitory computer readable medium of claim 17, wherein the playlist of a streaming content provider comprises a user-generated playlist of media items playable from the streaming content provider.

* * * * *